(12) United States Patent
Kuroda et al.

(10) Patent No.: US 10,581,245 B2
(45) Date of Patent: Mar. 3, 2020

(54) VOLTAGE/REACTIVE POWER OPERATION ASSISTING DEVICE AND ASSISTING METHOD, AND VOLTAGE/REACTIVE POWER OPERATION MONITORING CONTROL DEVICE AND MONITORING CONTROL METHOD

(71) Applicant: Hitachi, Ltd., Tokyo (JP)

(72) Inventors: Eisuke Kuroda, Tokyo (JP); Nao Saito, Tokyo (JP); Kouichi Hara, Tokyo (JP); Masahiro Yatsu, Tokyo (JP); Taichiro Kawahara, Tokyo (JP); Shota Omi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/335,278

(22) PCT Filed: Sep. 4, 2017

(86) PCT No.: PCT/JP2017/031786
§ 371 (c)(1),
(2) Date: Mar. 21, 2019

(87) PCT Pub. No.: WO2018/074082
PCT Pub. Date: Apr. 26, 2018

(65) Prior Publication Data
US 2019/0280481 A1 Sep. 12, 2019

(30) Foreign Application Priority Data
Oct. 20, 2016 (JP) .................................. 2016-205724

(51) Int. Cl.
*H02J 3/16* (2006.01)
*H02J 3/18* (2006.01)
(Continued)

(52) U.S. Cl.
CPC .................. *H02J 3/16* (2013.01); *H02J 3/00* (2013.01); *H02J 3/1835* (2013.01);
(Continued)

(58) Field of Classification Search
CPC ...... H02J 3/16; H02J 3/00; H02J 3/183; H02J 3/1871; H02J 13/00; Y02E 40/30;
(Continued)

(56) References Cited

U.S. PATENT DOCUMENTS 6,188,205 B1   2/2001  Tanimoto et al.
2017/0146574 A1  5/2017  Kuroda et al.
(Continued)

FOREIGN PATENT DOCUMENTS

JP   2000-261965 A   9/2000
JP   2002-165367 A   6/2002
(Continued)

OTHER PUBLICATIONS

International Search Report of PCT/JP2017/031786 dated Oct. 3, 2017.

*Primary Examiner* — Adolf D Berhane
(74) *Attorney, Agent, or Firm* — Mattingly & Malur, PC

(57) ABSTRACT

The setting range of the voltage and the reactive power of a power system is maintained during variations of voltage and power flow due to the output variation of renewable energy of a large number of power supplies which fluctuate due to weather. A voltage/reactive power operation assisting device is provided with a first database for storing the data to be evaluated, target value data, individual control device control method data, and individual control device data of an individual control device for adjusting the voltage/reactive power of a power system. A second database stores the device operation data of the individual control device; and the operation of the individual control device is predicted (Continued)

from the data stored in the first database to obtain individual control device operation prediction data. A display unit displays the individual control device operation prediction data and the device operation data in a contrastive manner.

14 Claims, 27 Drawing Sheets

(51) Int. Cl.
*H02J 13/00* (2006.01)
*H02J 3/00* (2006.01)

(52) U.S. Cl.
CPC ............ *H02J 3/1871* (2013.01); *H02J 13/00* (2013.01); *Y02E 40/30* (2013.01); *Y02E 40/34* (2013.01); *Y02E 40/74* (2013.01); *Y02E 60/726* (2013.01); *Y04S 10/22* (2013.01); *Y04S 10/24* (2013.01)

(58) Field of Classification Search
CPC ....... Y02E 40/34; Y02E 40/74; Y02E 60/726; Y02E 10/22; Y02E 10/24
See application file for complete search history.

(56) References Cited

U.S. PATENT DOCUMENTS

| 2018/0152020 A1* | 5/2018 | Kuroda ..................... H02J 3/00 |
| 2018/0351361 A1* | 12/2018 | Miyake ................ G05B 13/041 |
| 2019/0148977 A1* | 5/2019 | Kuroda ..................... H02J 3/00 |

FOREIGN PATENT DOCUMENTS

| JP | 2003-259555 A | 9/2003 |
| JP | 2015-090580 A | 5/2015 |
| WO | 2016/002339 A1 | 1/2016 |

\* cited by examiner

[FIG. 1]
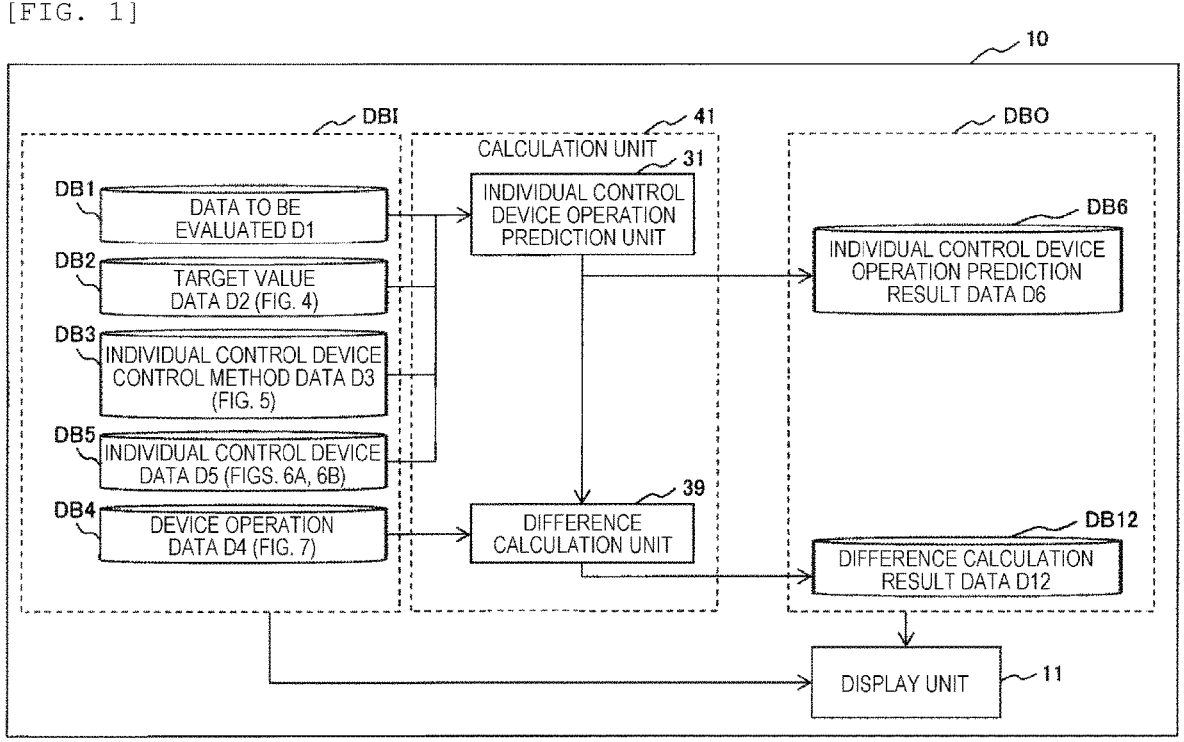

[FIG. 2]
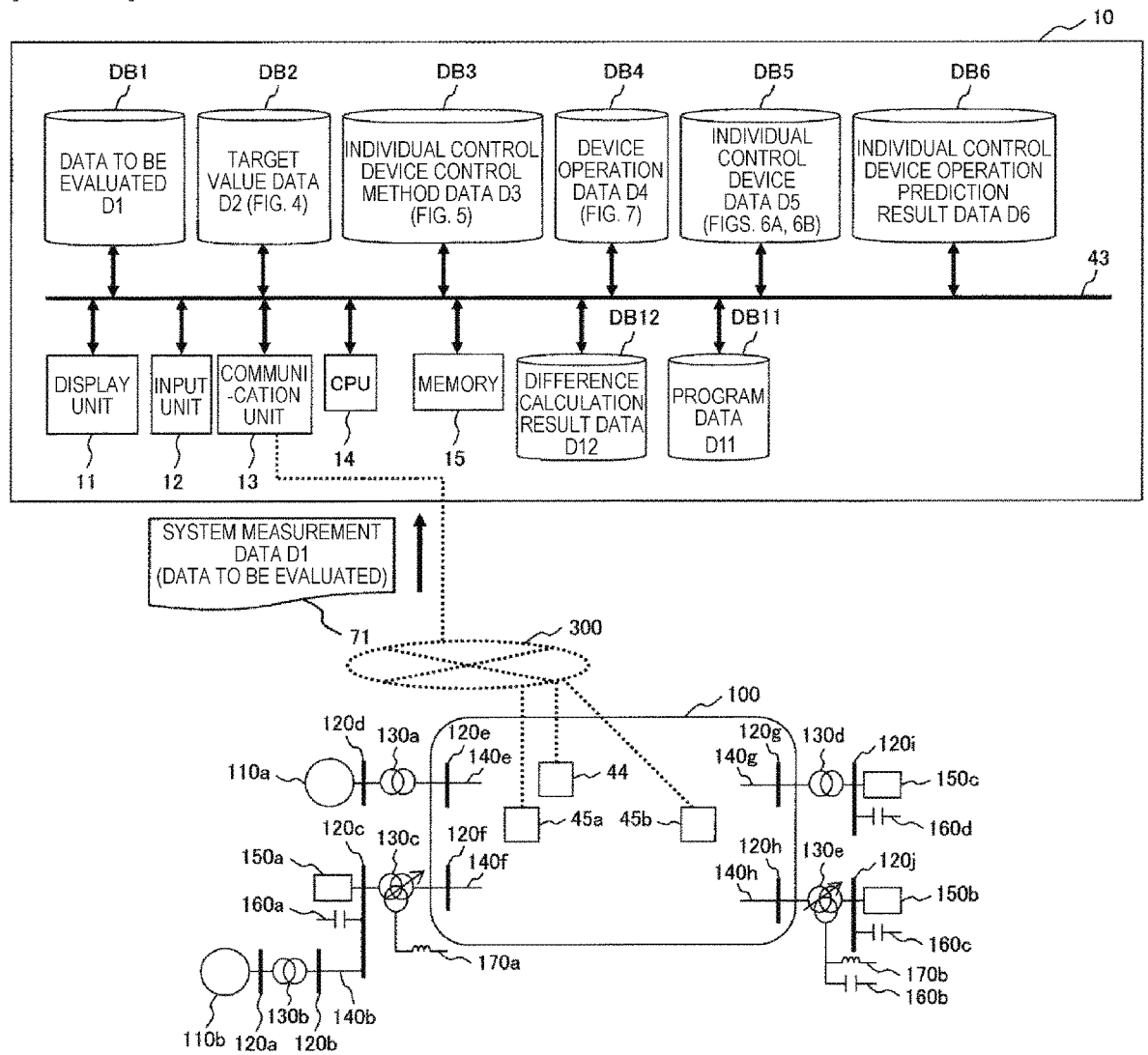

[FIG. 3]

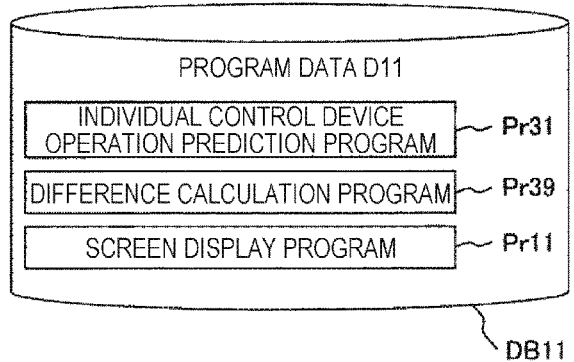

| INDIVIDUAL CONTROL DEVICE | 45a | | | | | | ... |
|---|---|---|---|---|---|---|---|
| TIME [s] | V1 | | | V2 | | | ... |
| | TARGET VALUE [p.u.] | UPPER DEAD ZONE WIDTH [p.u.] | LOWER DEAD ZONE WIDTH [p.u.] | TARGET VALUE [p.u.] | UPPER DEAD ZONE WIDTH [p.u.] | LOWER DEAD ZONE WIDTH [p.u.] | ... |
| t1 | 0.995 | NO CHANGE | NO CHANGE | 1.005 | NO CHANGE | NO CHANGE | ... |
| t2 | 1.000 | NO CHANGE | NO CHANGE | 1.010 | NO CHANGE | NO CHANGE | ... |
| : | : | : | : | : | : | : | : |

[FIG. 5]

| INDIVIDUAL CONTROL DEVICE | 45a | | | | | | | | ... |
|---|---|---|---|---|---|---|---|---|---|
| CONTROL METHOD | V1-V2 | | | | | | | | ... |
| TIME [s] | V1(REFERENCE VOLTAGE:525[kV]) | | | | V2(REFERENCE VOLTAGE:280.5[kV]) | | | | ... |
| | PREDETERMINED TARGET VALUE [p.u.] | OPERATION CONDITION [p.u.·seconds] | PREDETERMINED UPPER DEAD ZONE WIDTH [p.u.] | PREDETERMINED LOWER DEAD ZONE WIDTH [p.u.] | PREDETERMINED TARGET VALUE [p.u.] | OPERATION CONDITION [p.u.·seconds] | PREDETERMINED UPPER DEAD ZONE WIDTH [p.u.] | PREDETERMINED LOWER DEAD ZONE WIDTH [p.u.] | ... |
| t1 | 0.990 | 0.50 | 0.003 | 0.004 | 1.000 | 0.50 | 0.004 | 0.004 | ... |
| t2 | 0.995 | 0.50 | 0.003 | 0.004 | 1.005 | 0.50 | 0.004 | 0.004 | ... |
| : | : | : | : | : | : | : | : | : | . |

| INDIVIDUAL CONTROL DEVICE | PHASE ADJUSTMENT FACILITY | | | | LRT | | | | ... |
|---|---|---|---|---|---|---|---|---|---|
| | SC[PIECE] | ShR[PIECE] | | OPERATION DELAY [s] | STEP VALUE [p.u./TAP] | UPPER LIMIT VALUE [p.u.] | LOWER LIMIT VALUE [p.u.] | OPERATION DELAY [s] | ... |
| | 40 MVA | 20 MVA | -20 MVA | | | | | | ... |
| 45a | 8 | 8 | – | – | 0.005 | 1.055 | 0.945 | 6 | ... |
| 45b | 16 | 16 | 2 | – | 0.005 | 1.055 | 0.945 | 6 | ... |
| ⋮ | ⋮ | ⋮ | ⋮ | ⋮ | ⋮ | ⋮ | ⋮ | ⋮ | ⋮ |

| INDIVIDUAL CONTROL DEVICE | 45a | | | | ... |
|---|---|---|---|---|---|
| CONTROL METHOD | V1–V2 | | | | ... |
| TIME [s] | PHASE ADJUSTMENT FACILITY | | | LRT [TAP] | ... |
| | SC[PIECE] | ShR[PIECE] | | | ... |
| | 40 MVA | 20 MVA | -20 MVA | | |
| t1 | 4 | 2 | – | 6 | ... |
| t2 | 4 | 4 | 0 | 7 | ... |
| ⋮ | ⋮ | ⋮ | ⋮ | ⋮ | ⋮ |

| INDIVIDUAL CONTROL DEVICE | 45a | | | | ... |
|---|---|---|---|---|---|
| CONTROL METHOD | V1–V2 | | | | ... |
| TIME [s] | PHASE ADJUSTMENT FACILITY | | | LRT [TAP] | ... |
| | SC[PIECE] | ShR[PIECE] | | | |
| | 40 MVA | 20 MVA | -20 MVA | | ... |
| t1 | 4 | 2 | – | 6 | ... |
| t2 | 4 | 2 | – | 7 | ... |
| ⋮ | ⋮ | ⋮ | ⋮ | ⋮ | ⋮ |

[FIG. 8]
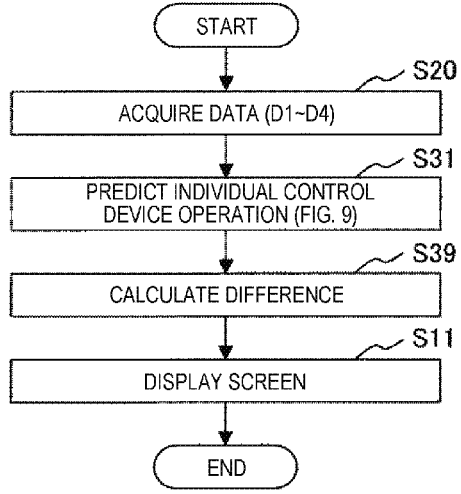
[FIG. 9]
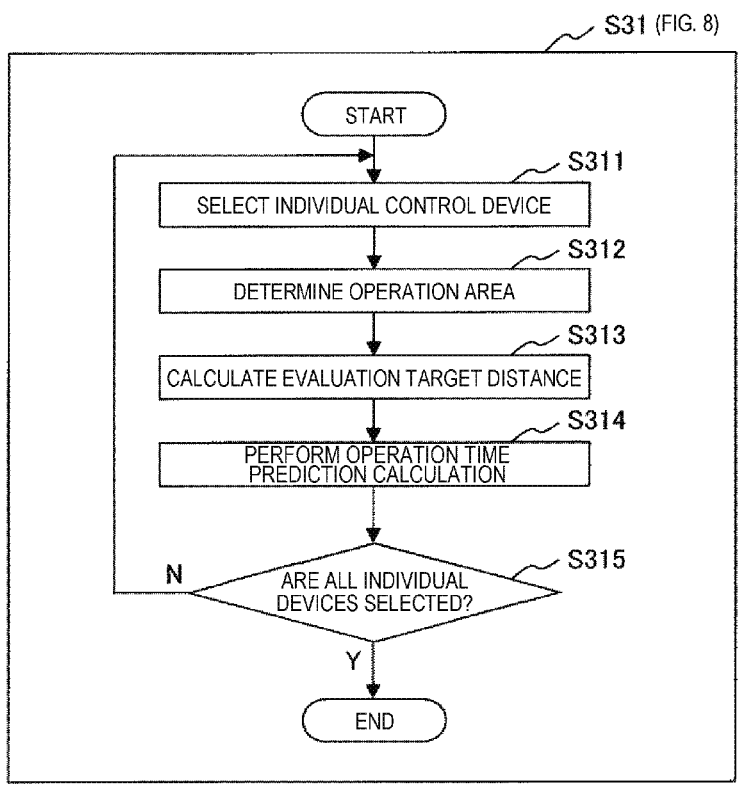

[FIG. 10]
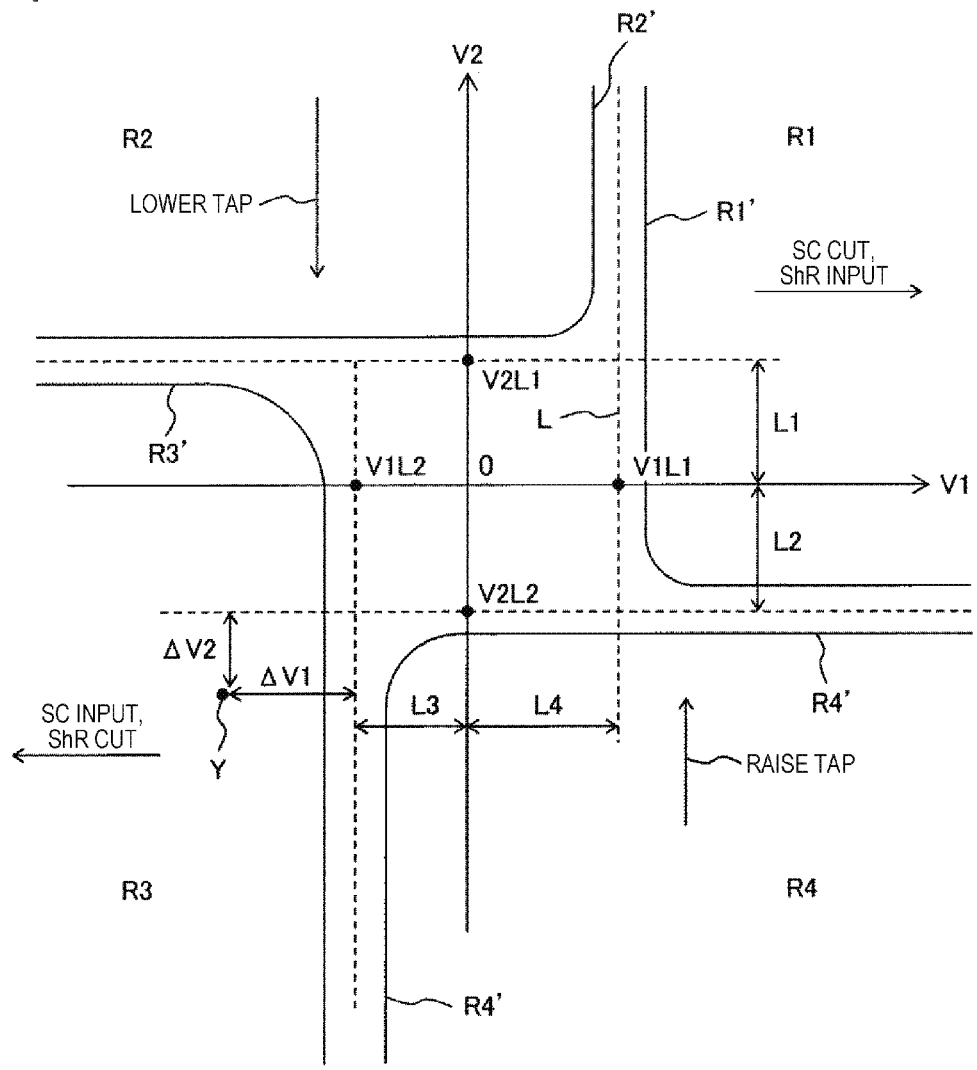
[FIG. 11]
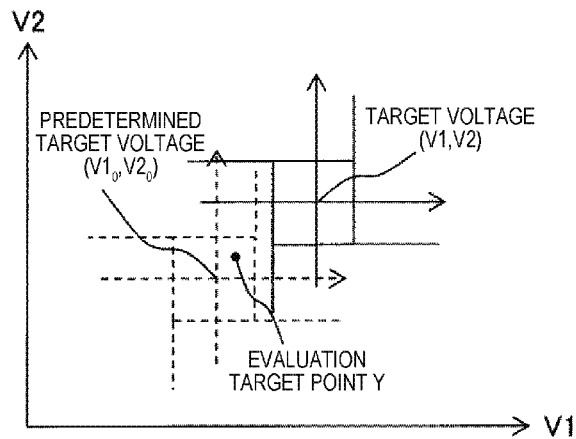

[FIG. 12]
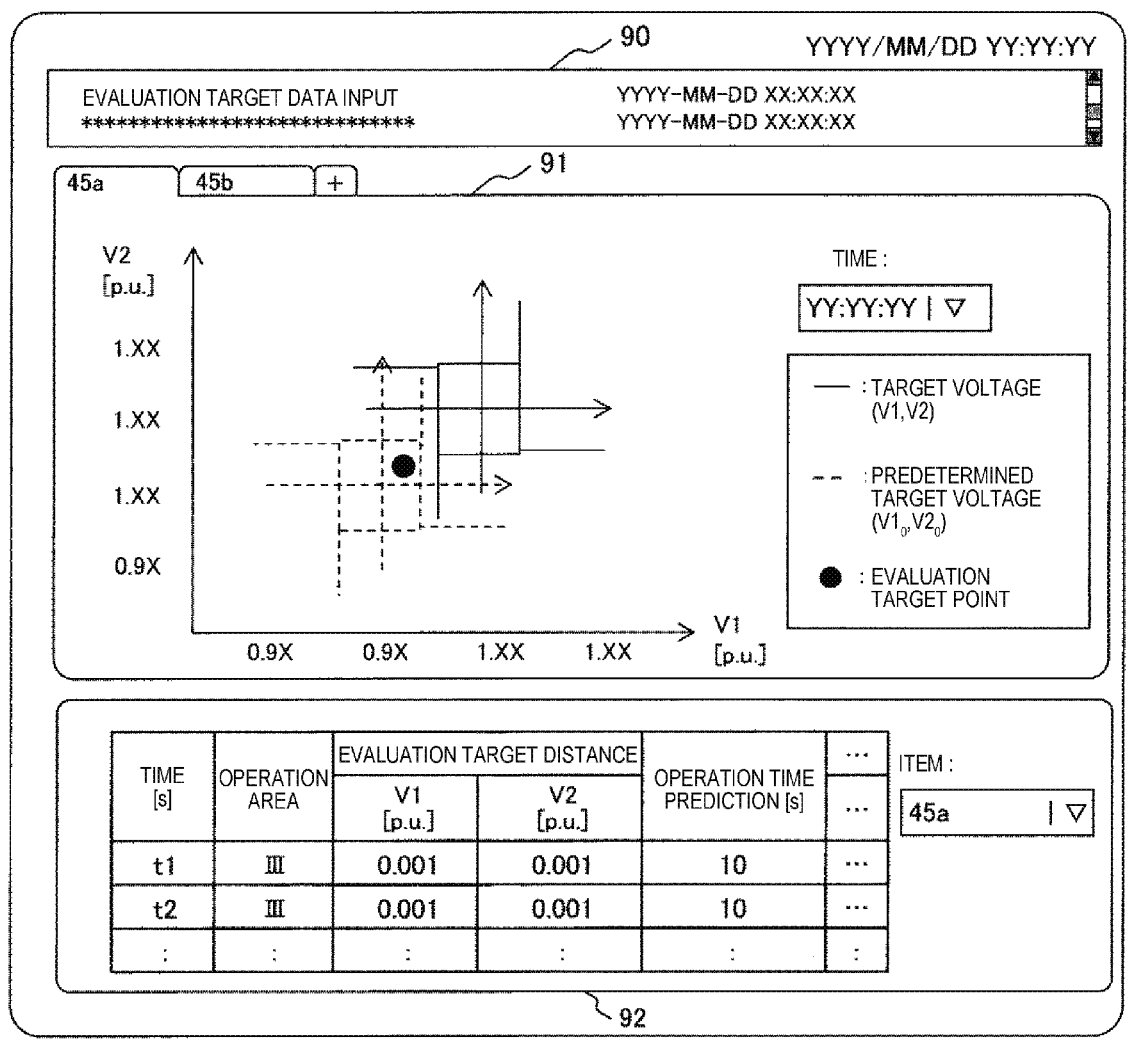

[FIG. 13]
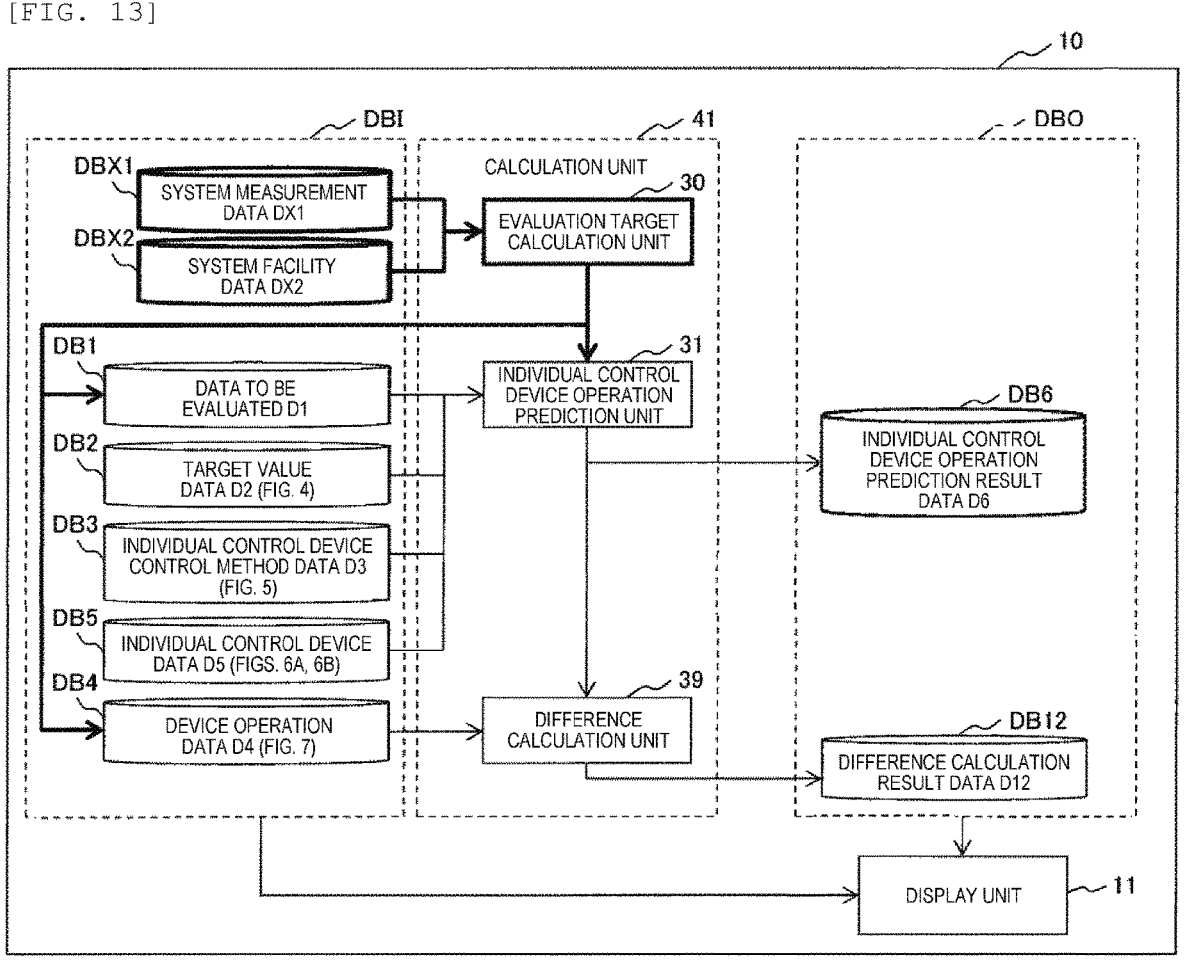

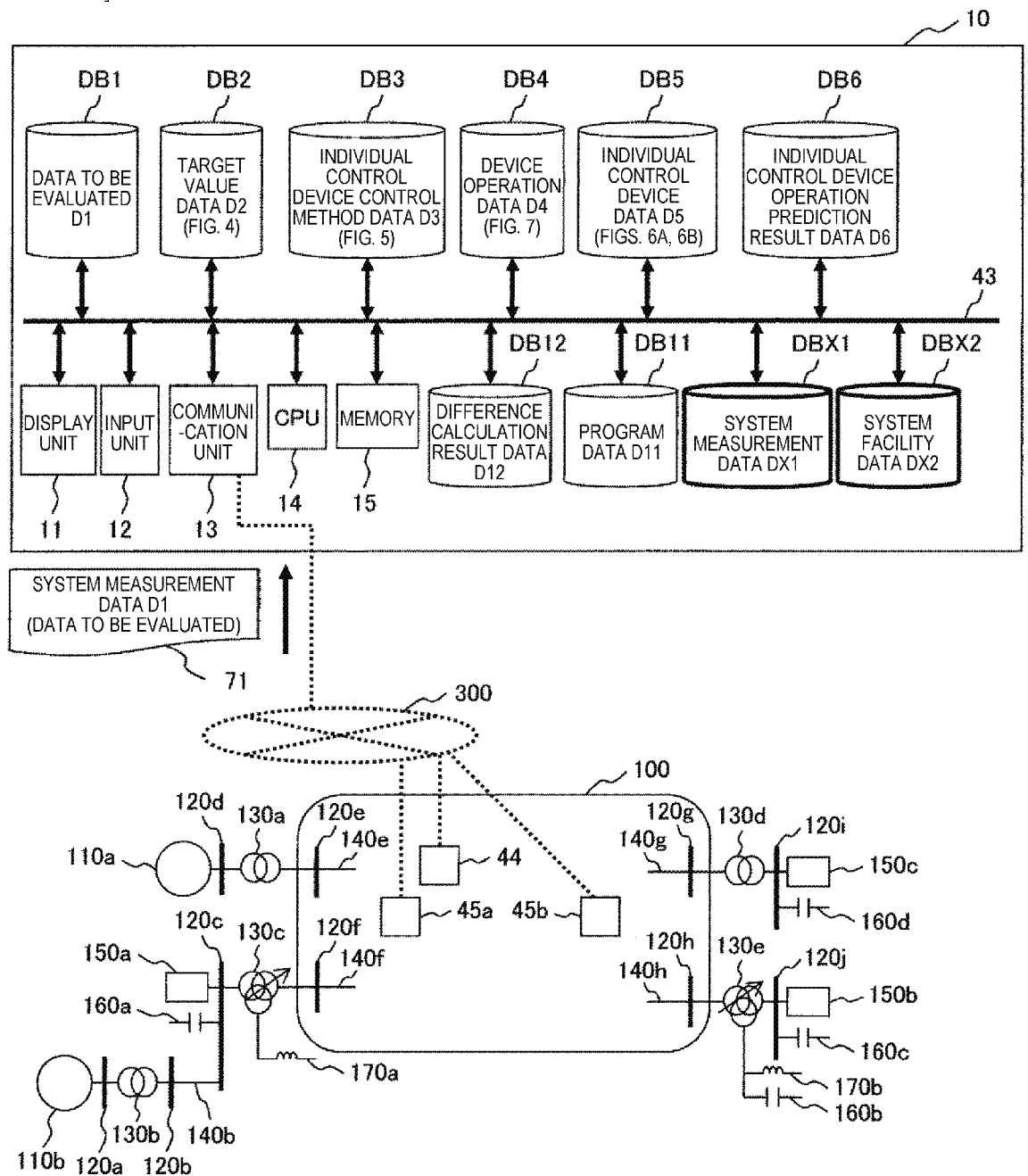
[FIG. 14]

[FIG. 15]
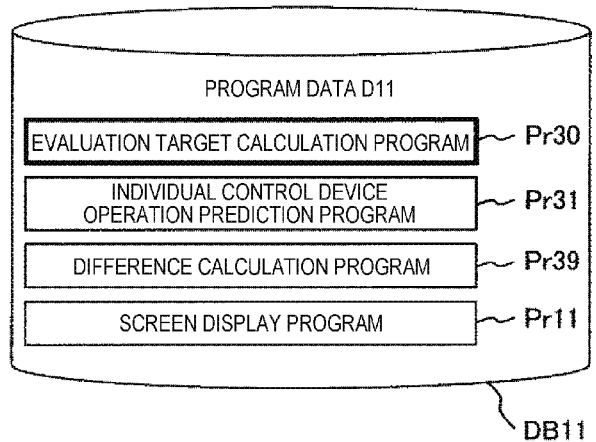
[FIG. 16]
| Time | DEVICE OPERATION | | | | TARGET VALUE CHANGE | | | | | INDICATOR CHANGE | |
|---|---|---|---|---|---|---|---|---|---|---|---|
| | 45a | | | | 45a | | 45b | | ... | | ... |
| | PHASE ADJUSTEMENT FACILITY | | | LRT [TAP] | V1 [p.u.] | V2 [p.u.] | V1 [p.u.] | V2 [p.u.] | ... | TRANSMISSION LOSS [p.u.] | ... |
| | SC[PIECE] | ShR [PIECE] | | | | | | | | | |
| | 40 MVA | 20 MVA | −20 MVA | | | | | | | | |
| YYYY.MM.DD HH.MM | 4 | 2 | − | 6 | 0.995 | *.*** | *.*** | *.*** | ... | *.*** | ... |
| | 4 | 4 | 0 | 7 | 1.000 | *.*** | *.*** | *.*** | ... | *.*** | ... |
| : | : | : | : | : | : | : | : | : | : | : | : |

[FIG. 17]
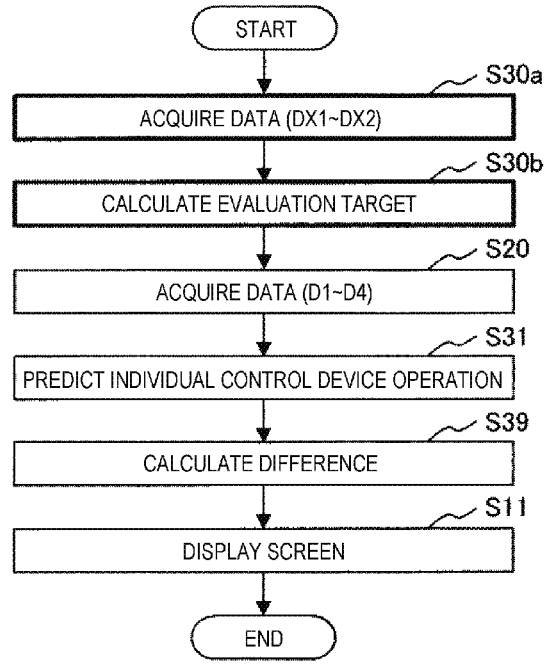
[FIG. 18A]
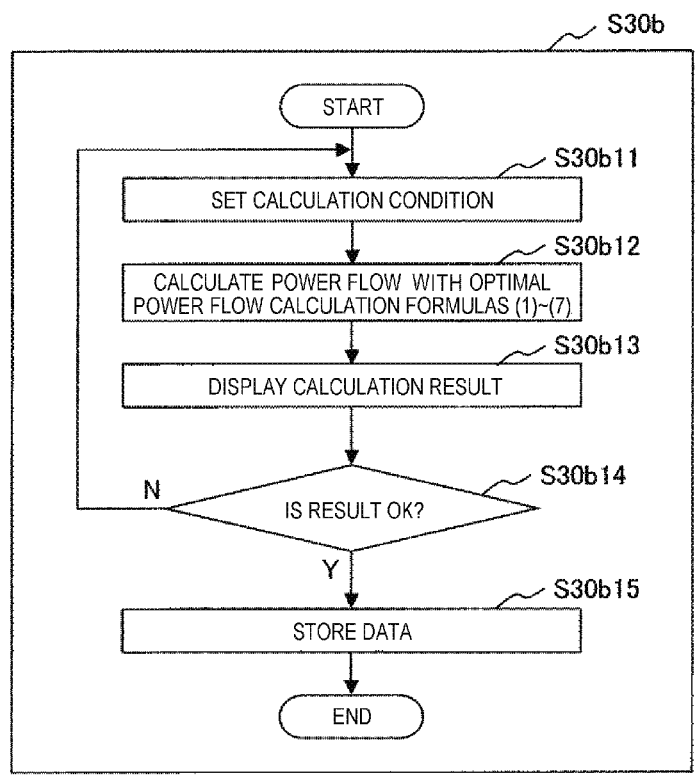

[FIG. 18B]
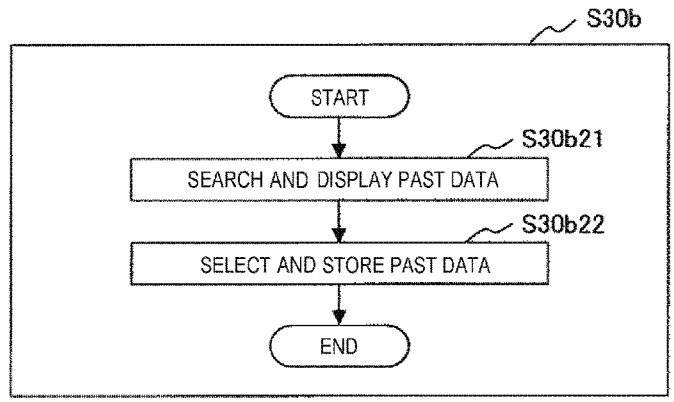
[FIG. 19]
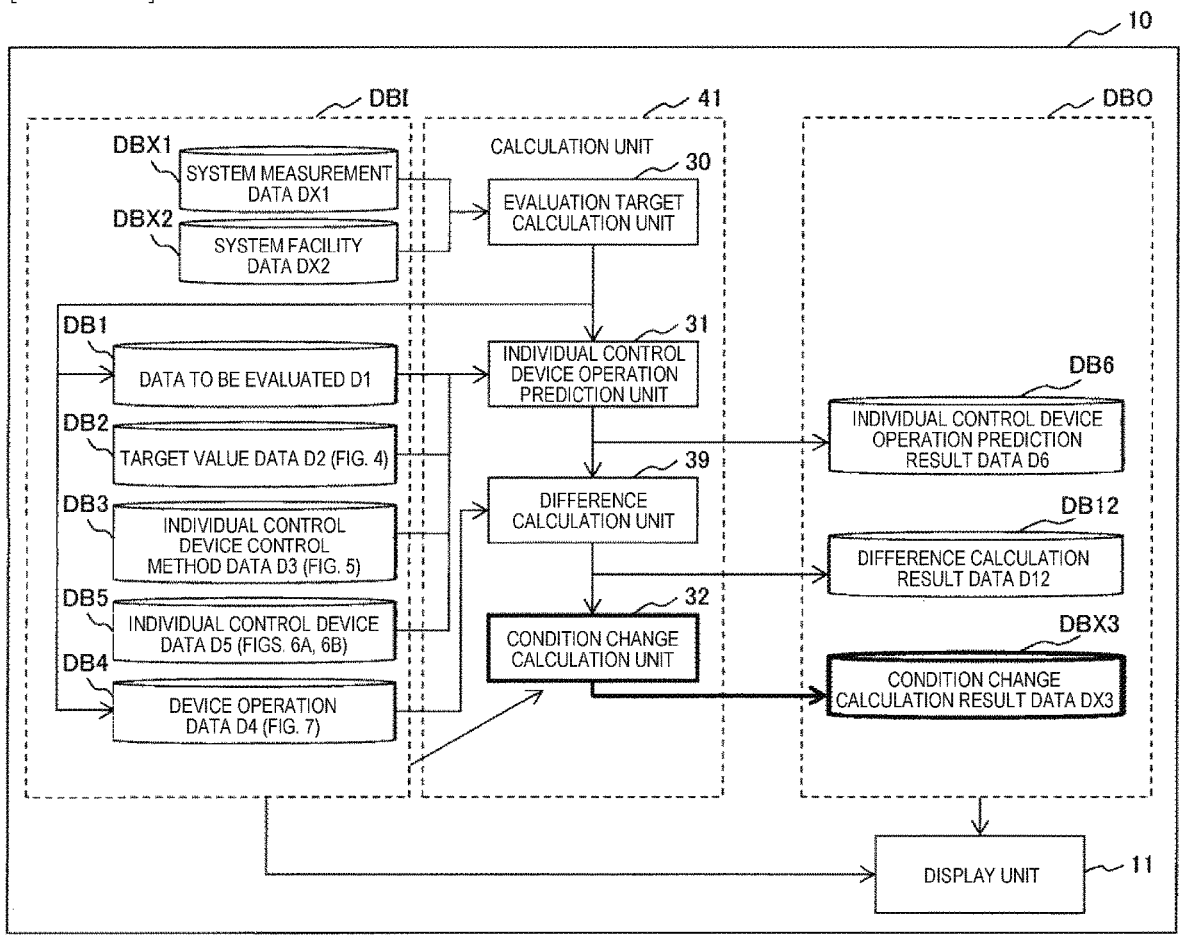

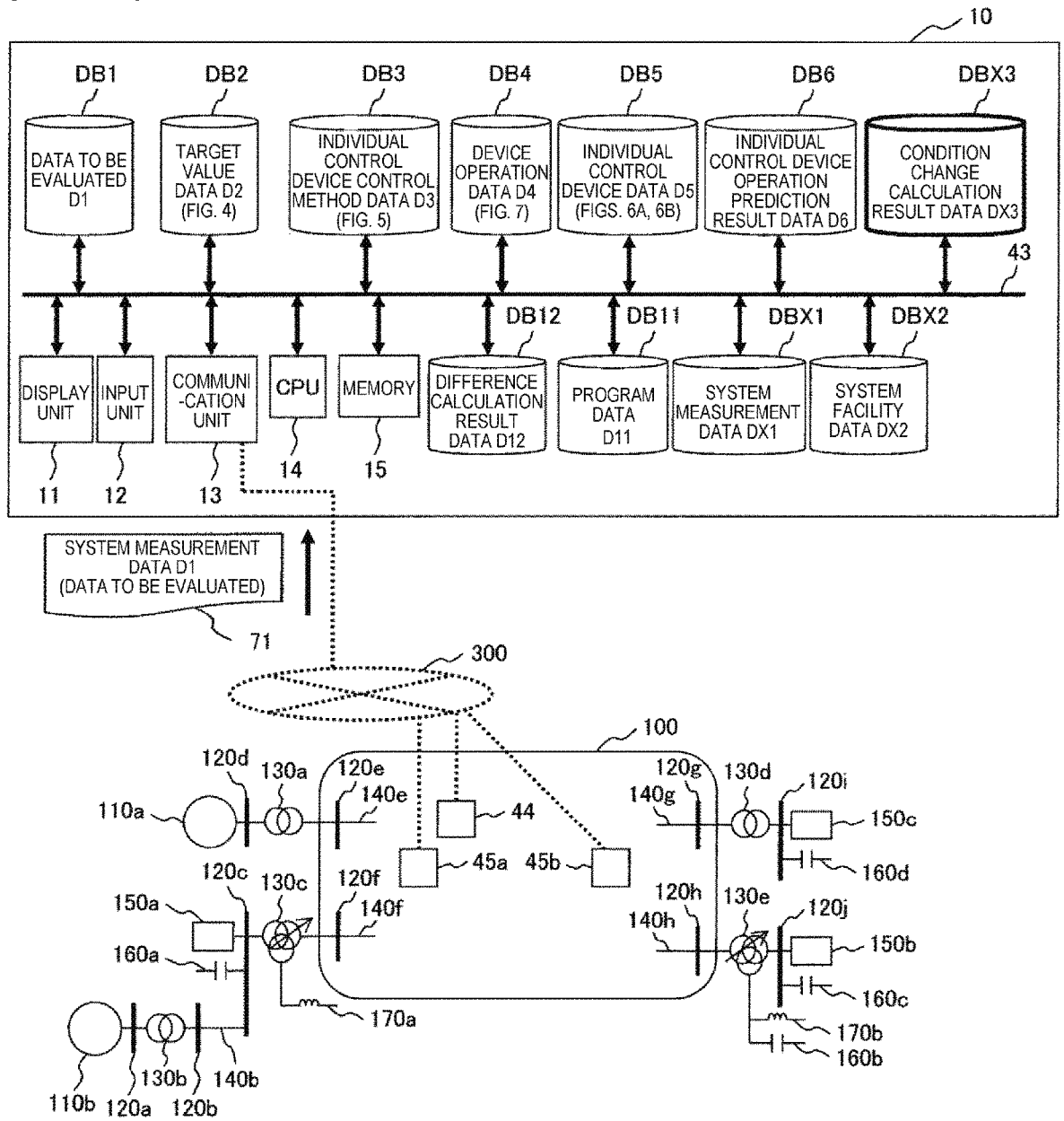
[FIG. 20]

[FIG. 21]
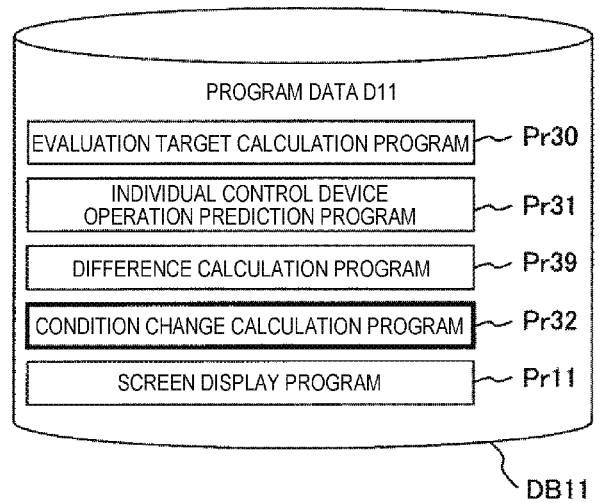
[FIG. 22]
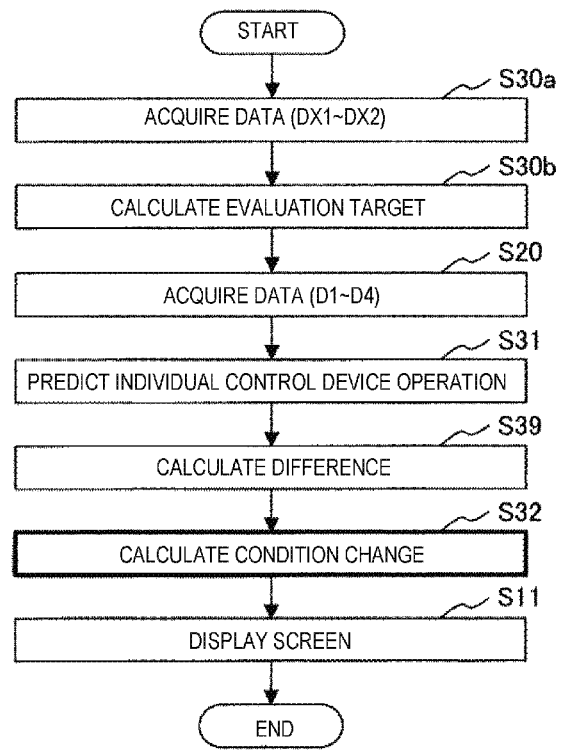

[FIG. 23A]
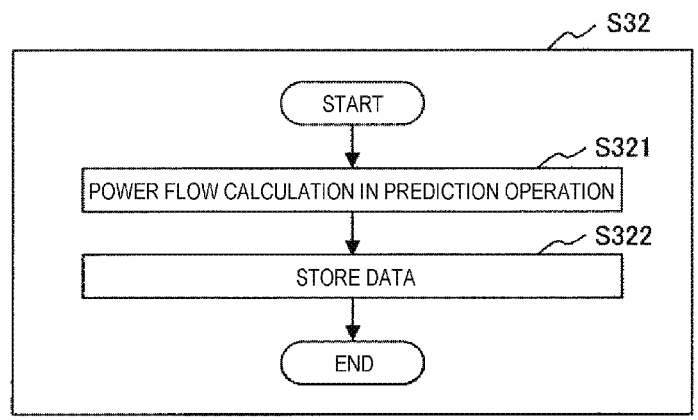
[FIG. 23B]
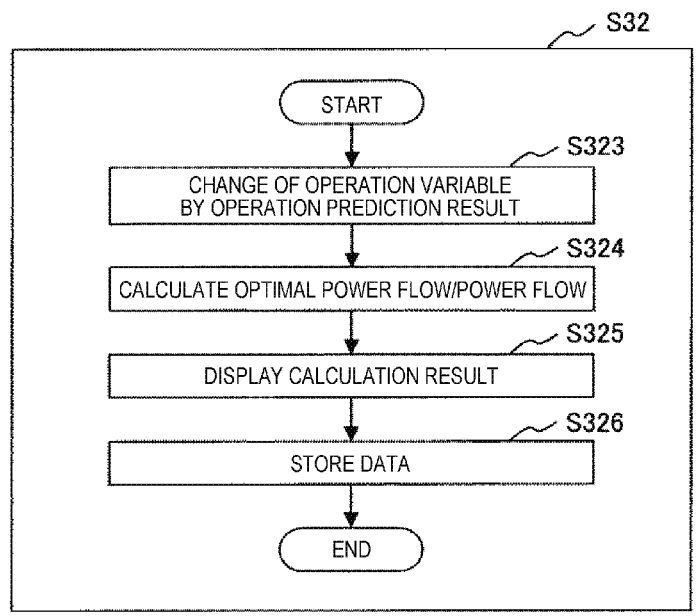

[FIG. 24]
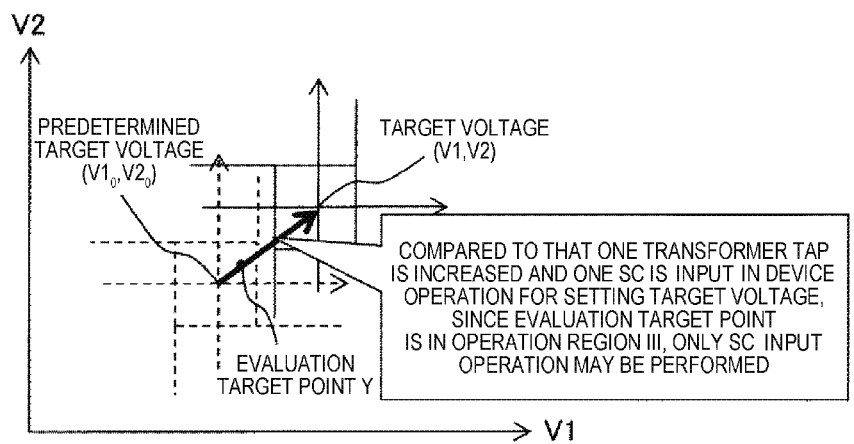

[FIG. 25]
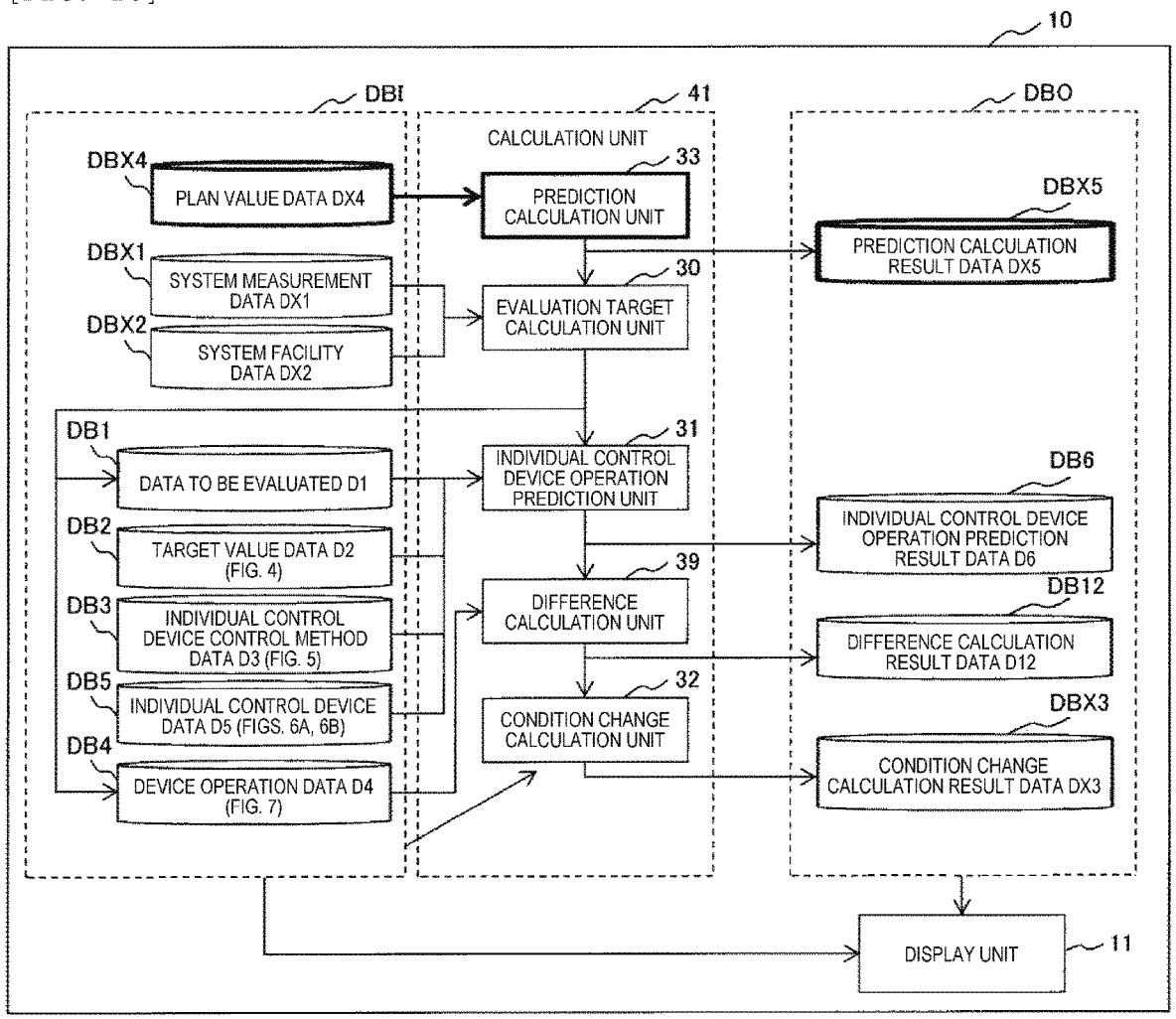

[FIG. 26]
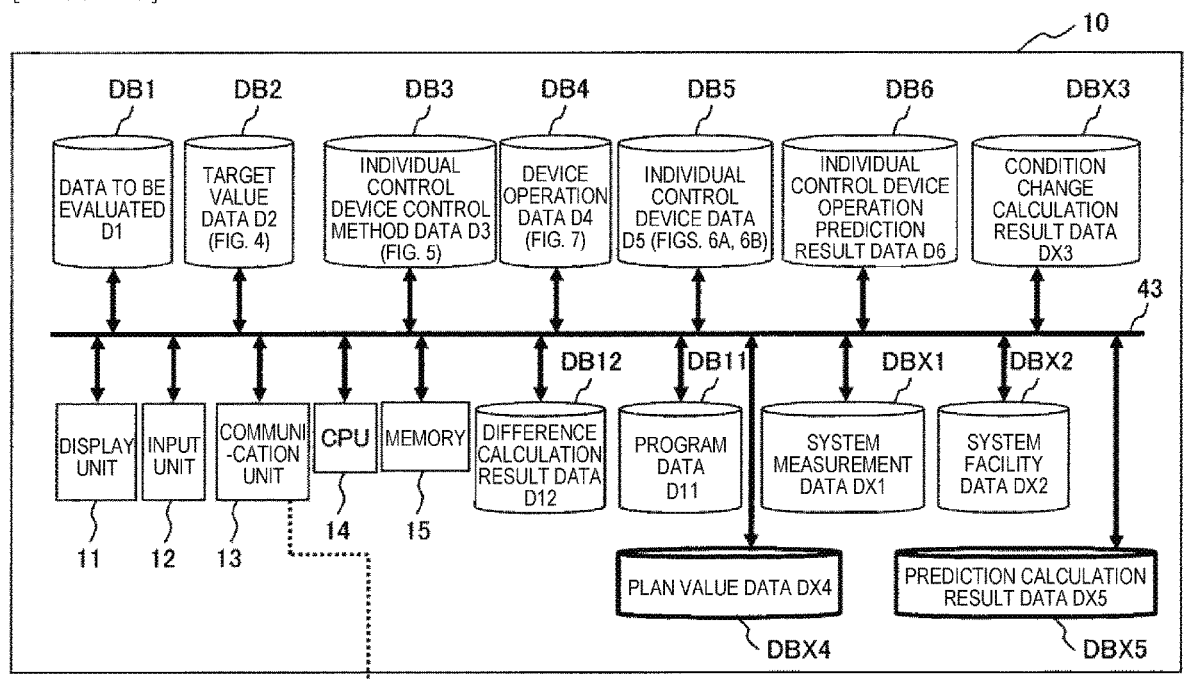
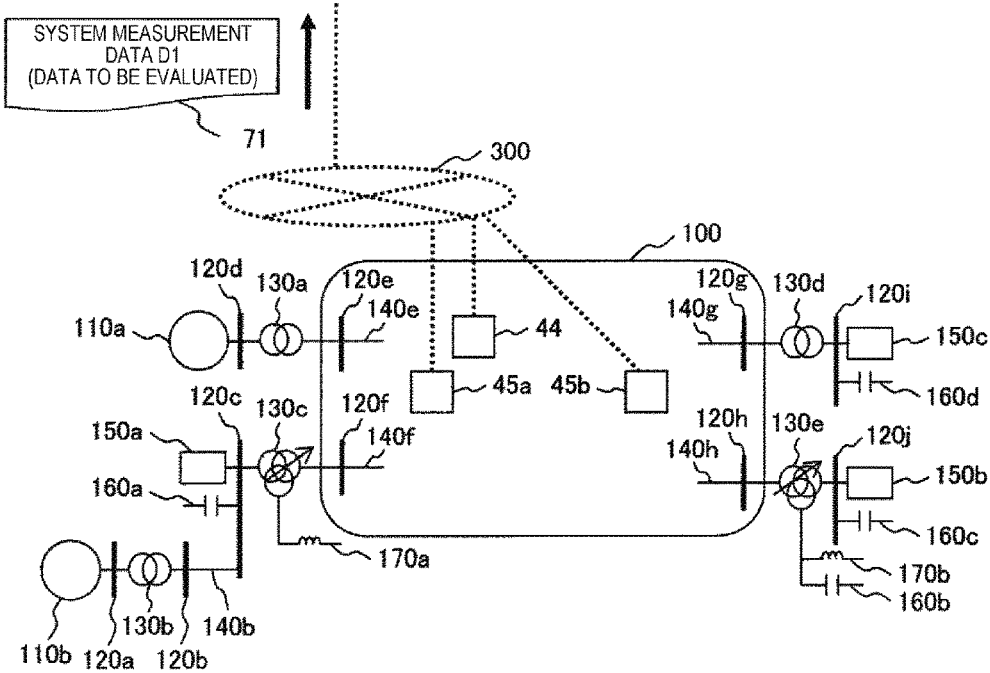

[FIG. 27]
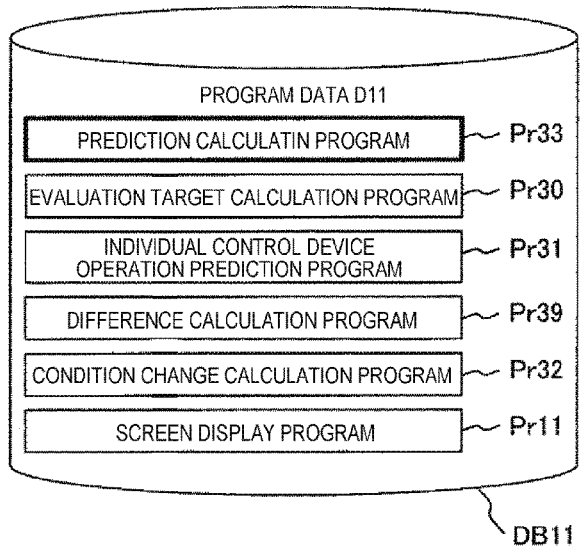
[FIG. 28]
| TIME [s] | PREDICTED DEMAND[p.u.] | | | | | POWER GENERATOR OUTPUT PLAN[p.u.] | | | | | CONTROL PLAN | | | | | | | | | | |
|---|---|---|---|---|---|---|---|---|---|---|---|---|---|---|---|---|---|---|---|---|---|
| | PL1 | QL1 | PL2 | QL2 | ... | PG1 | QG1 | PG2 | QG2 | ... | TAP1 | TAP2 | ... | SC1 | SC2 | ... | ShR1 | ShR2 | ... | AVR1 | AVR2 | ... |
| t1 | XX | XX | XX | XX | ... | XX | XX | XX | XX | ... | – | – | ... | – | – | ... | CUT | – | ... | XX | XX | ... |
| t2 | XX | XX | XX | XX | ... | XX | XX | XX | XX | ... | +1 | – | ... | INPUT | – | ... | – | – | ... | XX | XX | ... |
| : | : | : | : | : | : | : | : | : | : | : | : | : | : | : | : | : | : | : | : | : | : |

[FIG. 29]
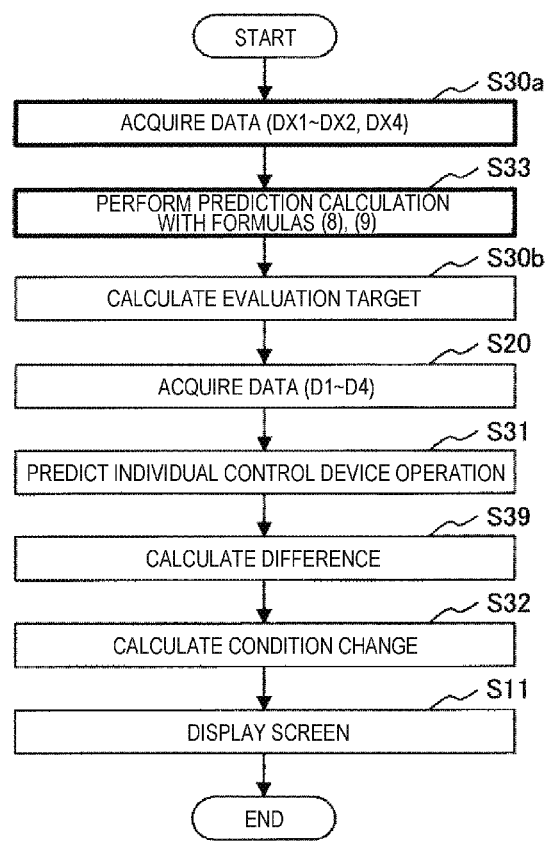

[FIG. 30]
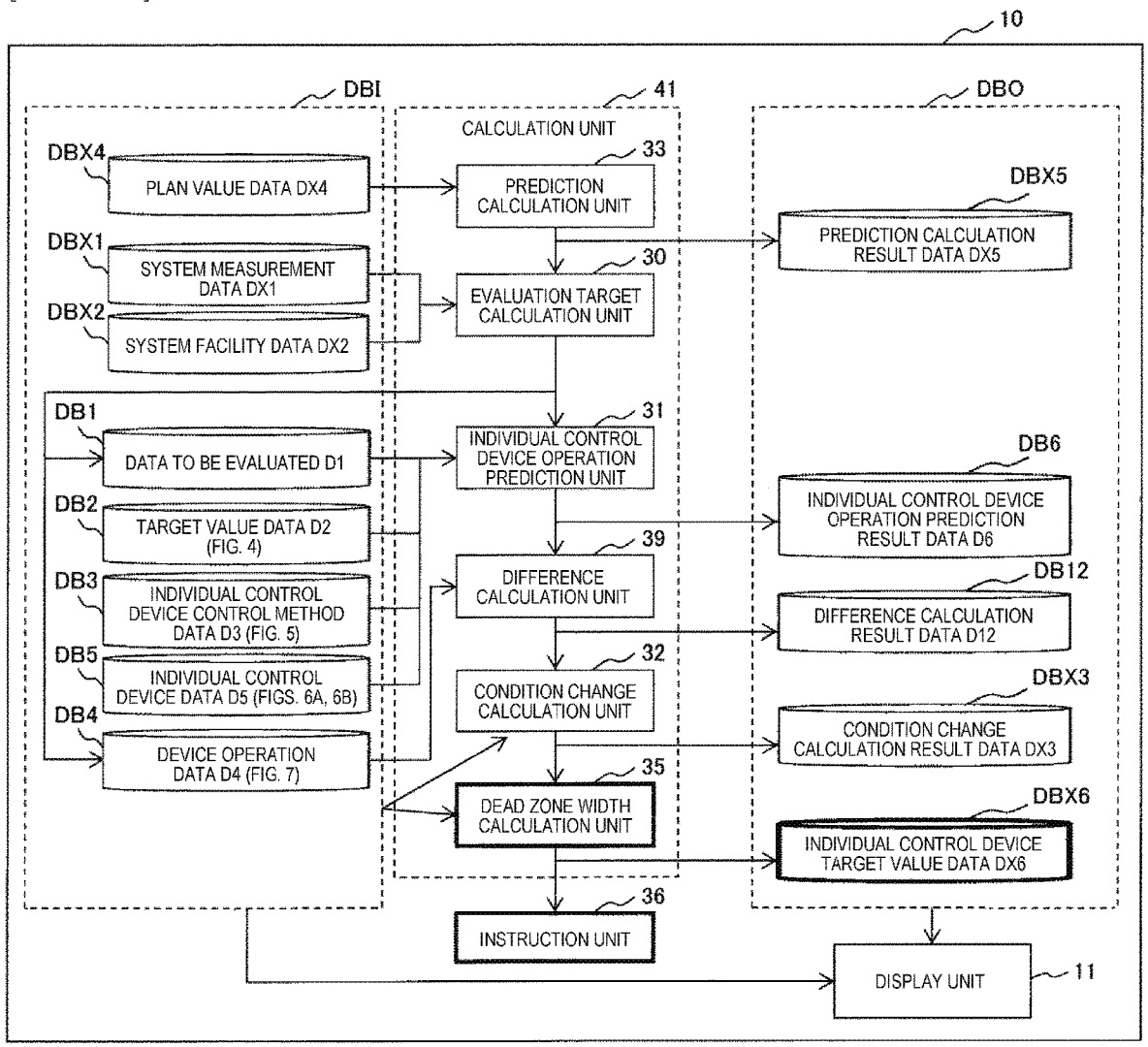

[FIG. 31]
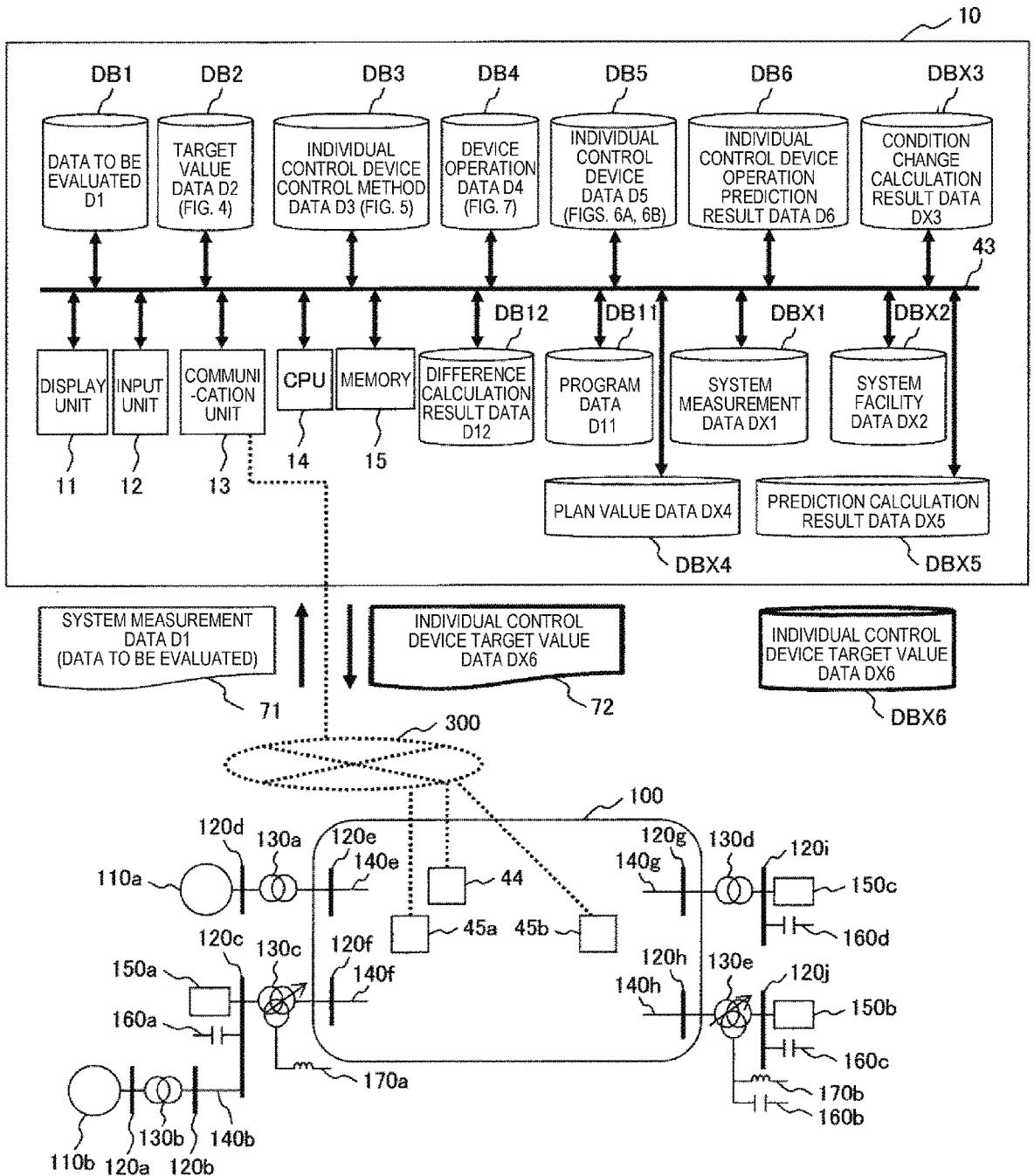

[FIG. 32]
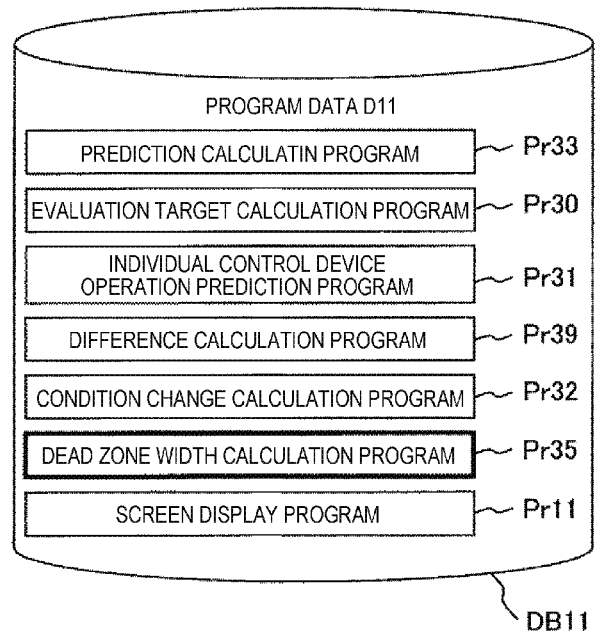

[FIG. 33]
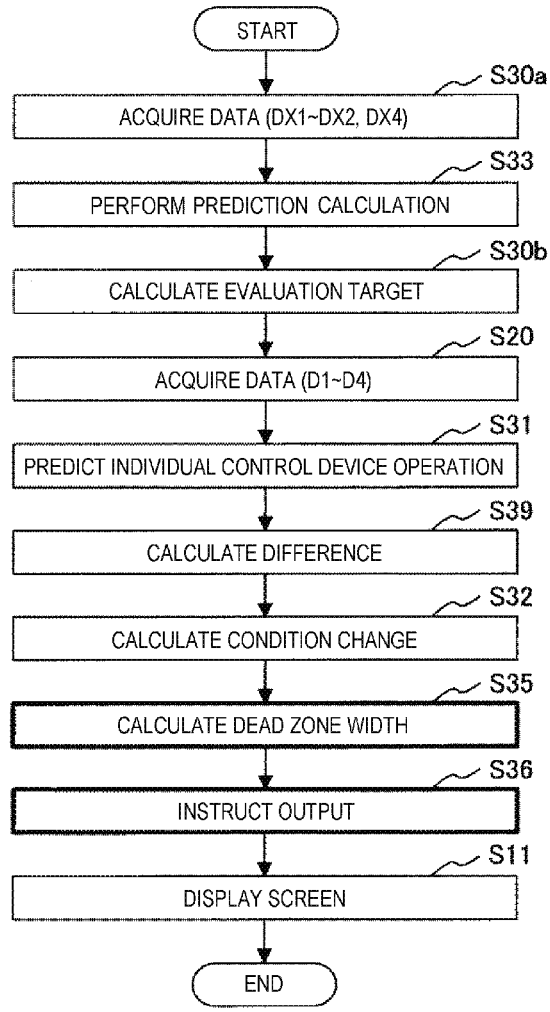
[FIG. 34]
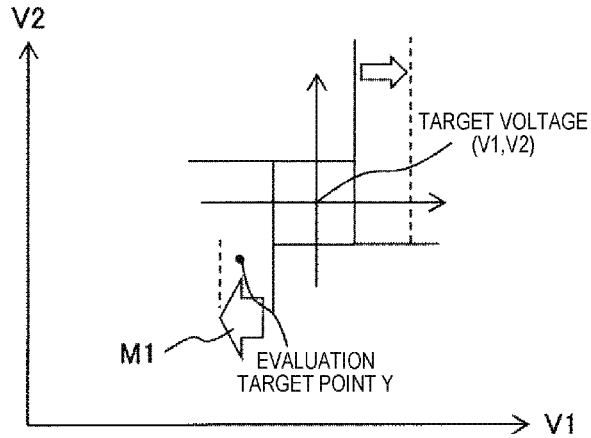

[FIG. 35]
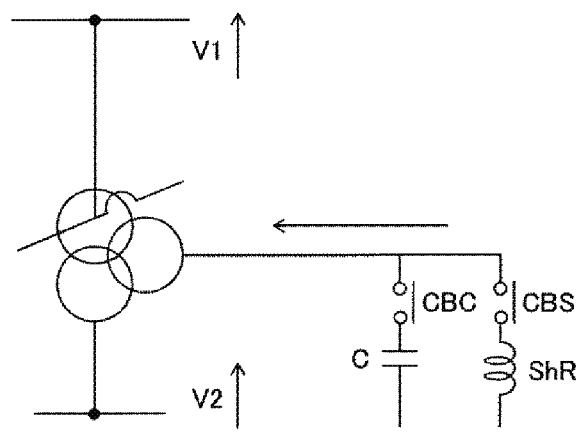
[FIG. 36]
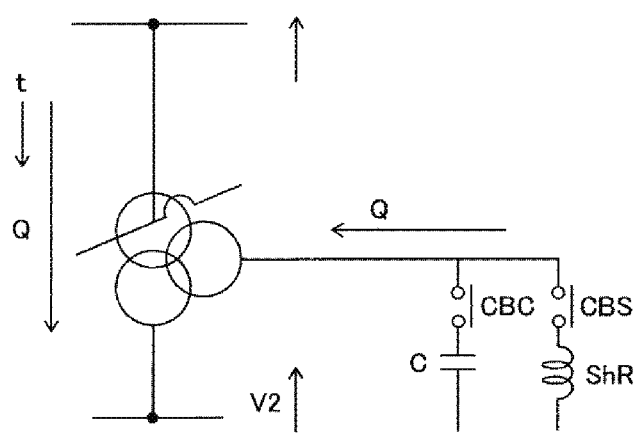

[FIG. 37]
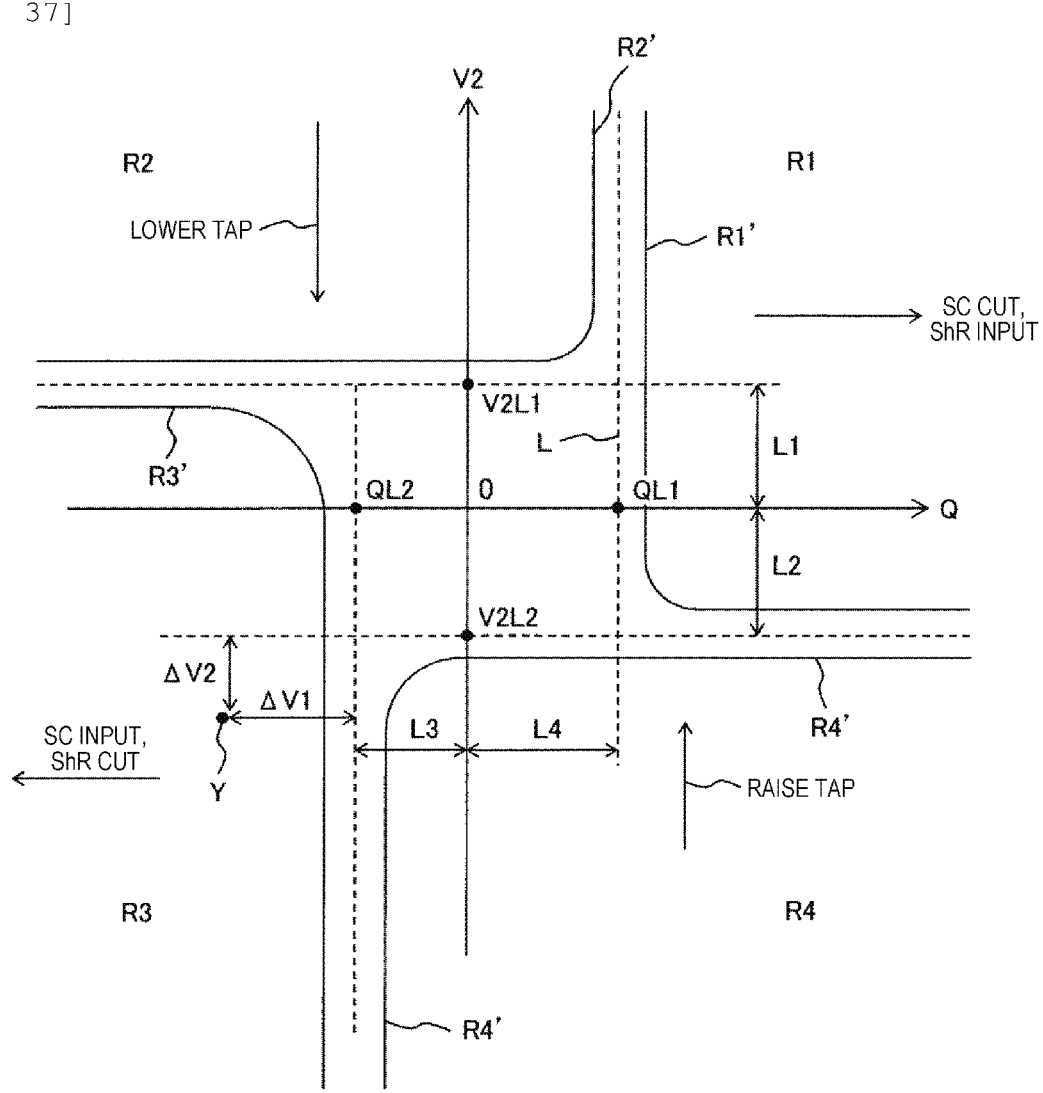

[FIG. 38]
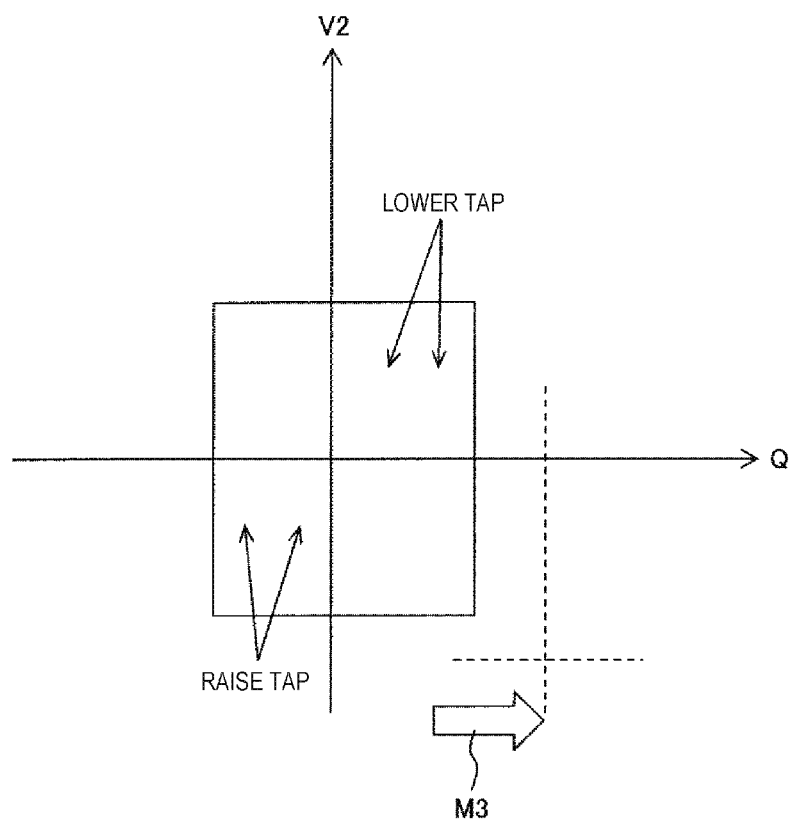

VOLTAGE/REACTIVE POWER OPERATION ASSISTING DEVICE AND ASSISTING METHOD, AND VOLTAGE/REACTIVE POWER OPERATION MONITORING CONTROL DEVICE AND MONITORING CONTROL METHOD

TECHNICAL FIELD

The present relates to a voltage/reactive power operation assisting device and assisting method, and a voltage/reactive power operation monitoring control device and monitoring control method in a power system for achieving one or more of maintaining the balance between and a setting range of the voltage and the reactive power of the power system, improving economic efficiency, and reducing the labor of an operator for setting a reference value, a target value, or a setting value of a voltage control device.

BACKGROUND ART

Non-patent document 1, non-patent document 2 and non-patent document 3 are known as background art in the technical field. In these non-patent documents, the following matters are generally disclosed.

There are mainly individual control method and central control method (central VQC method) as methods of voltage/reactive power control. It is to be noted that the voltage/reactive power control also includes automatic voltage control (AVC), which is referred to as voltage/reactive power control here.

The individual control method is a method of controlling based only on the information within the own site of each electric power station, and is divided into a time schedule control method and an individual voltage/reactive power Q control (voltage/reactive power control, VQC) method. Since information is distributed and determined by each control device, it is also referred to as a distributed control method.

In the time schedule control method, controlling are performed individually between: controlling by way of inputting and opening operation of the phase adjustment facility such as power capacitor (SC: static condenser (capacitor), static capacitor, shunt capacitor) and shunt reactors (ShR: shunt reactor, shunt reactor) according to time schedule; and controlling of mainly voltage regulating relays (voltage regulating relay, 90 Ry) of the transformer, on-load tap changer (LTC: tap changer/device under load) by automatic voltage regulator and load ratio control transformer (LRT, tap changeover transformer/device under load).

The individual VQC method cooperatively controls the phase adjustment facility and the LRT and the LTC of the transformer, and includes, as main control methods, the V1-V2 control method, the V2-Q1 control method, and the V2 control method. The V2 control method does not cooperatively control the phase adjustment facility, the LRT and the LTC of the transformer, but it is included as the individual VQC method.

The V1-V2 control method is a method in which the deviation of the measured value from the reference value, the target value, or the setting value of the primary bus voltage V1 and the secondary bus voltage V2 is integrated, and when the integration value of the deviation exceeds a specified value, a control signal is sent to one of the phase adjustment facility, the LRT and the LTC of the transformer to control the voltage.

The V1-Q1 control method is a method in which the deviation of the measured value from the reference value, the target value, or the setting value of the secondary bus voltage V2 and the transformer first pass reactive power Q1 are integrated, and when the integration value of the deviation exceeds a specified value, a control signal is sent to one of the phase adjustment facility, the LRT and the LTC of the transformer to control the voltage.

The V2 control method is a method in which the deviation of the measured value from the reference value, the target value, or the setting value of the secondary bus voltage V2 is integrated, and when the integration value of the deviation exceeds a specified value, a control signal is sent to the LRT and the LTC of the transformer to control the voltage.

The individual VQC method requires that each substation device independently determine and operate, the timepiece of each device be precisely matched and the pattern of the reference value, the target value, or the setting value be switched, and that the coordination of the entire system be set up, but since the method is highly compliant with changes in system condition such as accident and so on and is capable of high speed control, it is possible to maintain a balance between the voltage and the reactive power in voltage stability patterns of various systems.

The central VQC method collects system measurement data (active power P, reactive power Q, voltage V, and the like) of a plurality of measurement devices installed in the power system and performs computation (determination) with a central control unit, a central processing unit, a system stabilization unit, and the like installed in a central power supply command station, and the like, using the system measurement data and system facility data, and controls the main voltage control device and voltage/reactive power control device of the power system cooperatively with a control method that can be divided into indirect control method (target value command method, target value control method) and direct control method. In the indirect control method, a reference value, a target value, or a setting value is transmitted, and in the direct control method, an operation command is transmitted. This method is also referred to as a centralized control method, since information is concentrated and determined by the central control unit. Like the target value control method, the method can be a combination of the centralized control method and the individual VQC method (distributed control method) in some cases. From the viewpoint of voltage/reactive power control, the power supply operation system has a hierarchical structure mainly hierarchically classified by voltage class and is also referred to as hierarchical voltage control (HVC).

Here, the voltage control device includes an Automatic Voltage Regulator (AVR), Automatic Reactive Power (Q) Regulator (AQR), Power System Voltage Regulator (PSVR), Synchronous Condenser (RC, rotary capacitor), Static Var Compensator (SVC), Static Synchronous Compensator (STATCOM), and the like, in addition to the phase adjustment facility, the LRT and the LTC of the transformer, which is the voltage/reactive power control device.

As a general method of the computation of the central VQC method, there is a method of combining one or more deviations from reference value, target value, or setting value (such as reference voltage, target voltage, or setting voltage) at a plurality of voltage monitoring points of the system into one evaluation function and obtaining an operation amount of the device to minimizing the same. For the evaluation function, the minimization of the voltage deviation at the monitoring point and the transmission loss of the monitoring transmission line are often adopted, and the sensitivity coefficient by the AC method or the sensitivity coefficient by the DC method is often used for the evaluation of the effect. The security of the system may be considered. Since the central VQC method requires determination of the voltage in the system and the active and reactive power distribution, sensitivity analysis of the effect by each control device and selective computation of the optimum control pattern, the controlling takes about several minutes depending on the computation processing capability of the central processing unit. For this reason, especially the direct control method may not be able to provide high-speed controlling at the time of an accident, and it is thus used in combination with the individual control method that is capable of high-speed controlling in some cases. For the computation of the central VQC method, since it is necessary to minimize or maximize the evaluation function in order to obtain the optimum system state, various minimization calculations and optimal power flow calculations (OPF) are often used.

In the indirect control method (target value command method, target value control method), the reference value, the target value, or the setting value calculated by the central VQC device is sent from the central control device (central VQC device) to an individual control device (individual VQC device), for example, and when the reference value, the target value, or the setting value is the target value of the voltage and the reactive power, for example, a deviation between the voltage and the reactive power at the monitoring point (control target point) of the individual VQC device and target values of the voltage and the reactive power is detected according to the individual VQC method, and the voltage control device is operated so that the voltage and the reactive power at the monitoring point is maintained at the target value of the voltage or the reactive power.

There are cases of controlling collectively the individual VQC devices installed at respective sites of the system, or indirectly controlling the individual VQC devices installed at the sites of the system grouped in several blocks, or controlling only specific individual VQC device, and the like. Examples of the technical background of the indirect control method include Tanimoto, Morita, Takahashi, Sakamoto, Kurokawa, Fukui: "Central VQC method based on target voltage command to individual VQC device", Journal of the Institute of Electrical Engineers of Japan, Vol. 126, N. 8, pp. 783-788 (2006).

The computation at the individual VQC device calculates an amount of integration of the deviation between the voltage and the voltage target value at the monitoring point (strictly, the deviation amount from the dead zone), and when the calculated result exceeds a preset value, sends a control output to the voltage control device. Therefore, when the target voltage is changed, a time delay occurs before the voltage is controlled close to the target voltage. Therefore, in order to control the system voltage close to the desired target voltage upon sudden change in the load as in the daytime, the target voltage is set in advance in consideration of this time delay. Specifically, the optimal power flow calculation (OPF) of the central VQC device is performed in the prediction system one point ahead (for example, a few minutes ahead) and command is issued accordingly. As a result, it may be expected that the last voltage distribution that is obtained after several minutes of the calculation would approach the optimum distribution. In the event that a large voltage violation is detected due to a system accident or the like, a function may also be provided, which executes the optimal power flow calculation (OPF) of the system section at that point in time and commands the individual VQC device with a temporary target voltage.

In the central VQC device, the direct control method causes the voltage control device to operate so that the state of the voltage and the reactive power of the monitoring point are optimized by calculating and transmitting the operation command of the voltage control device calculated by the central VQC device. The computation method of the central VQC device is the method described above. In the direct control method, as described above, control is performed at about several minute-interval, and the central VQC device performs optimal power flow calculation (O) of a prediction system one point ahead and controls based thereon, as in the indirect control method.

For the background technology in this technical field, reference can be made to JP-A-2003-259555 (PTL 1). This publication describes: "The monitoring point deviation amount integration means 15 integrates deviation amounts from the upper limit value and the lower limit value of the bus the voltage and the reactive power flow to be monitored from the system state obtained by the voltage system information grasping means 11, and the departure determination means 13 activates the control amount calculation means 12 when the deviation amount integration value exceeds a preset departure threshold value. The control amount calculation means 12 calculates the control amount of the voltage/reactive power adjustment device 3 so that the bus voltage and the reactive power flow to be monitored are within an allowable value, and outputs a command to the voltage/reactive power adjustment device 3 through the command output means 14 and the information transmission devices 4c and 4d. As a result, it is possible to suppress a response to a micro disturbance, and to perform control even when the deviation occurs for a short time when a large departure occurs".

For the background technology in this technical field, reference can be made to JP-A-2002-165367 (PTL 2). This publication describes: "The voltage/reactive power control system includes a central VQC device 101 and a plurality of individual VQC devices 202. The central VQC device 101 receives the active power flow P from the plurality of individual VQC devices 202, calculates a reference voltage which is the optimal target voltage of the individual VQC device 202 in each block based thereon, and transmits the reference voltage to the individual VQC device 202. In the individual control unit 200, the reactive power amount Q from a predetermined position in the block 201 is gathered in the individual VQC device 202 and controls the balance of the reactive power Q in an autonomous distributed manner to maintain the reference voltage transmitted from the central VQC device 101".

CITATION LIST

Patent Literature

PTL 1: JP-A-2003-259555
PTL 2: JP-A-2002-165367

Non-Patent Literature

Non-patent document 1: Voltage/reactive power control survey committee of power system: "Voltage/reactive power control of power system", Technical Report of Institute of Electrical Engineers, No. 743, pp. 22-40 (1999)

Non-patent document 2: Akihiko Yokoyama, Koji Ota: "Power system stabilization system engineering", The Institute of Electrical Engineers, Ohm company, pp. 203-206 (2014)

Non-patent document 3: Kazuya Okuei: "II. Electronic Technology for Power System Operation (II-1) Automation of Power System Operation (Automatic Power Supply)", The Journal of the Japan Society of Electrical and Electronic Engineers, Vol. 87, No. 945, pp. 1010-1016 (1967)

SUMMARY OF INVENTION

Technical Problem

In the future electric power system, a large amount of power supply (output fluctuation type power supply) including renewable energy (such as a photovoltaic power generation system or a wind power generation system), of which output varies according to weather conditions, is planned to be introduced, and the renewable energy, which varies according to weather conditions, is likely to be increased fluctuation amount of the voltage and the power flow.

In the power system, there is a possibility that the power supply configuration and system configuration may be changed in a certain period according to the state of voltage and power flow, periodic inspection or the like. For this reason, when the operation point shifts, a reference value, a target value, or a setting value of the voltage control device that is preset by reflecting the intention of an operator would not always correspond to the state of the system, in which there is a risk that the balance between and the setting range of the voltage and the reactive power of a power system may not be maintained, or economic efficiency may not be improved. There is a problem that the labor of an operator to set the reference value, the target value, or the setting value of the voltage control device may increase.

In relation to the above problems, while the voltage/reactive power operation assisting and monitoring control device is described in PTL 1 as: "The operation target value setting means 18 sets the operation target value of the bus voltage and the transmission line reactive power flow to be monitored by the voltage/reactive power monitoring control device 1, and the control amount calculating means 12 calculates the control amount for the voltage/reactive power adjustment device 3 provided at a plurality of positions of the power system so that the bus voltage and the transmission line reactive power flow to be monitored are within the predetermined range of the operation target value. The control amount of each voltage/reactive power adjustment device from the control amount calculation means 12 is output to the voltage/reactive power adjustment device 3 of the power system 2 through the information transmission devices 4c and 4d by the command output means 14", there is no description of a specific calculation method by the operation target value setting means. There also is a concern that the labor of an operator for setting the reference value, the target value, or the setting value of the voltage control device may increase.

The voltage/reactive power control system is described in PTL 2 as: "The reference voltage calculating means calculates the optimum value of the control target voltage of each substation block, since each substation block is controlled to have an optimum target voltage, each substation may be suitably controlled, and (0019) more preferably, the optimum value of the control target voltage calculated by the reference voltage calculation means includes a value at which the amount of the transmission loss is minimum or a value at which the number of operation devices in each substation block is the minimum", but there is no description of a specific calculation method by the reference voltage calculation means.

For this reason, when there is one or more of the following: the variations of voltage and power flow becoming large due to the output variation of renewable energy or the like; and a power supply configuration or a system configuration being changed, for example, there is a concern that the individual VQC device may not be always operated in the manner as desired, and the balance between and the setting range of the voltage and the reactive power of a power system may not be maintained, or economic efficiency may not be improved, by a simple way of solving the optimization problem, which is designed to minimize the deviation from the target value of the voltage or reactive power or minimize the transmission loss, and determining the reference voltage. To set the reference value, the target value, or the setting value of the voltage control device to solve the above shortcoming, trial and error is required and there is a concern that the labor of an operator is increased.

Therefore, in the present invention, it is an object of the present invention to provide a voltage/reactive power operation assisting device and an assisting method, and a voltage/reactive power operation monitoring control device and a monitoring control method capable of achieving one or more of maintaining the balance between and the setting range of the voltage and the reactive power of a power system, improving economic efficiency, and reducing the labor of an operator for setting the reference value, the target value, or the setting value of the voltage control device even when one or more of the following is occurred: the variations of voltage and power flow becoming large due to the output variation of renewable energy or the like; and a power supply configuration or a system configuration being changed.

Solution to Problem

In order to solve the above problem, for example, the configuration described in the claims is adopted.

According to an aspect of the present invention, a plurality of means are provided for solving the problem mentioned above, as in, for example, "A voltage/reactive power operation assisting device including: a first database for storing data to be evaluated, target value data, individual control device control method data, and individual control device data of an individual control device for adjusting a voltage/reactive power of a power system; a second database for storing device operation data of the individual control device; an individual control device operation prediction unit for predicting an operation of the individual control device from data stored in the first database to obtain individual control device operation prediction data; and a display unit for displaying the individual control device operation prediction data and the device operation data for comparison".

According to another aspect of the present invention, there is provided "A voltage/reactive power operation assisting device including: a first database for storing data to be evaluated, target value data, individual control device control method data, and individual control device data of an individual control device for adjusting a voltage/reactive power of a power system; a second database for storing device operation data of the individual control device; an individual control device operation prediction unit for predicting an operation of the individual control device from data stored in the first database to obtain individual control device operation prediction data; a difference calculation unit that obtains a difference from the individual control device operation prediction data and the device operation data, and a display unit for displaying the difference".

According to still another aspect of the present invention, there is provided "A voltage/reactive power operation monitoring control device for providing individual control device target value data to an individual control device which is installed in a power system to adjust a voltage/reactive power of the power system, the voltage/reactive power operation monitoring control device including a first database for storing data to be evaluated, target value data, individual control device control method data, and individual control device data of an individual control device for adjusting a voltage/reactive power of a power system; a second database for storing device operation data of the individual control device; an individual control device operation prediction unit that predicts an operation of the individual control device from the data stored in the first database to obtain individual control device operation prediction data; and transmit unit that transmits a function for transmitting the individual control device operation prediction data to the individual control device as individual control device target value data".

According to still another aspect of the present invention, there is provided "A voltage/reactive power operation assisting method including: storing data to be evaluated, target value data, individual control device control method data, individual control device data, and device operation data of an individual control device for adjusting a voltage/reactive power of a power system; obtaining individual control device operation prediction data by predicting the operation of the individual control device from the data to be evaluated, the target value data, the individual control device control method data, and the individual control device data; and displaying the individual control device operation prediction data and the device operation data for comparison".

According to still another aspect of the present invention, there is provided "A voltage/reactive power operation assisting method including: storing data to be evaluated, target value data, individual control device control method data, individual control device data, and device operation data of an individual control device for adjusting a voltage/reactive power of a power system; obtaining individual control device operation prediction data by predicting the operation of the individual control device from the data to be evaluated, the target value data, the individual control device control method data, and the individual control device data; obtaining a difference from the individual control device operation prediction data and the device operation data; and displaying the difference".

According to still another aspect of the present invention, there is provided "A voltage/reactive power operation monitoring control method for providing individual control device target value data to an individual control device which is installed in a power system to adjust a voltage/reactive power of the power system, the method including: storing data to be evaluated, target value data, individual control device control method data, individual control device data, and device operation data of an individual control device for adjusting the voltage/reactive power of a power system; obtaining individual control device operation prediction data by predicting the operation of the individual control device from the data to be evaluated, the target value data, the individual control device control method data, and the individual control device data; and transmitting individual control device operation prediction data to the individual control device as individual control device target value data".

Advantageous Effects of Invention

According to the present invention, it is possible to achieve one or more of maintaining the balance between and the setting range of the voltage and the reactive power of a power system; improving economic efficiency; and reducing the labor of an operator for setting the reference value, the target value, or the setting value of the voltage control device even when one or more of the following is occurred: the variations in the voltage and the power flow becoming large due to output variation of renewable energy or the like; and a power supply configuration or a system configuration being changed.

BRIEF DESCRIPTION OF DRAWINGS

FIG. 1 is a diagram illustrating a functional configuration of a voltage/reactive power operation assisting and monitoring control device according to Embodiment 1.

FIG. 2 is a diagram illustrating an example of an overall configuration of a hardware configuration and a power system of the voltage/reactive power operation assisting and monitoring control device according to Embodiment 1.

FIG. 3 is a diagram illustrating an example of a configuration of a program database DB11 of the voltage/reactive power operation assisting and monitoring control device according to Embodiment 1.

FIG. 4 is a diagram illustrating an example of target value data D2 stored in a target value database DB2.

FIG. 5 is a diagram illustrating an example of an individual control device control method data D3 stored in an individual control device control method database DB3.

FIG. 6A is a diagram illustrating an example of an individual control device data D5 stored in an individual control device database DB5.

FIG. 6B is a diagram illustrating an example of the individual control device data D5 stored in the individual control device database DB5.

FIG. 7 is a diagram illustrating an example of a device operation data D4 stored in a device operation database DB4.

FIG. 8 is a flowchart illustrating entire processing of the voltage/reactive power operation assisting and monitoring control device according to Embodiment 1.

FIG. 9 is a flowchart illustrating an example of an individual control device operation prediction processing of the voltage/reactive power operation assisting and monitoring control device according to Embodiment 1.

FIG. 10 is a diagram illustrating an example of a processing of an operation region determination of individual control device operation prediction and an evaluation target distance calculation for a V1-V2 control method of the individual control device (individual VQC).

FIG. 11 is a diagram illustrating an example of a relationship between a preset target voltage, an evaluation target point, and a target voltage in the V1-V2 control method of the individual control device (individual VQC).

FIG. 12 is a view illustrating an example of a screen for confirming the individual control device operation prediction result and the difference calculation result.

FIG. 13 is a diagram illustrating a functional configuration of a voltage/reactive power operation assisting and monitoring control device according to Embodiment 2.

FIG. 14 is a diagram illustrating an example of an overall configuration of a hardware configuration and a power system of the voltage/reactive power operation assisting and monitoring control device according to Embodiment 2.

FIG. 15 is a diagram illustrating an example of a configuration of a program database DB11 of the voltage/reactive power operation assisting and monitoring control device according to Embodiment 2.

FIG. 16 is a diagram illustrating an example of past data according to Embodiment 2.

FIG. 17 is a flowchart illustrating entire processing of the voltage/reactive power operation assisting and monitoring control device according to Embodiment 2.

FIG. 18A is a flowchart illustrating a processing of the evaluation target calculation by the voltage/reactive power operation assisting and monitoring control device according to Embodiment 2.

FIG. 18B is a flowchart illustrating the processing of the evaluation target calculation by the voltage/reactive power operation assisting and monitoring control device according to Embodiment 2.

FIG. 19 is a diagram illustrating a functional configuration of the voltage/reactive power operation assisting and monitoring control device according to Embodiment 3.

FIG. 20 is a diagram illustrating an example of the overall configuration of the hardware configuration and the power system of the voltage/reactive power operation assisting and monitoring control device according to Embodiment 3.

FIG. 21 is a diagram illustrating an example of the configuration of the program database DB11 of the voltage/reactive power operation assisting and monitoring control device according to Embodiment 3.

FIG. 22 is a flowchart illustrating the entire processing of the voltage/reactive power operation assisting and monitoring control device according to Embodiment 3.

FIG. 23A is a flowchart illustrating an example of a processing of condition change calculation of a voltage/reactive power operation assisting and monitoring control device according to Embodiment 3.

FIG. 23B is a flowchart illustrating an example of the processing of condition change calculation of the voltage/reactive power operation assisting and monitoring control device according to Embodiment 3.

FIG. 24 is a diagram for explaining an example of the processing of changing an operation variable of optimal power flow calculation (OPF).

FIG. 25 is a diagram illustrating a functional configuration of a voltage/reactive power operation assisting and monitoring control device according to Embodiment 4.

FIG. 26 is a diagram illustrating an example of the overall configuration of a hardware configuration and a power system of the voltage/reactive power operation assisting and monitoring control device according to Embodiment 4.

FIG. 27 is a diagram illustrating an example of a configuration of the program database DB11 of the voltage/reactive power operation assisting and monitoring control device according to Embodiment 4.

FIG. 28 is a diagram illustrating stored contents of a plan value database DBX4.

FIG. 29 is a flowchart illustrating entire processing of the voltage/reactive power operation assisting and monitoring control device according to Embodiment 4.

FIG. 30 is a diagram illustrating a functional configuration of a voltage/reactive power operation assisting and monitoring control device according to Embodiment 5.

FIG. 31 is a diagram illustrating an example of the overall configuration of a hardware configuration and a power system of the voltage/reactive power operation assisting and monitoring control device according to Embodiment 5.

FIG. 32 is a diagram illustrating an example of a configuration of the program database DB11 of the voltage/reactive power operation assisting and monitoring control device according to Embodiment 5.

FIG. 33 is a flowchart illustrating entire processing of the voltage/reactive power operation assisting and monitoring control device according to Embodiment 5.

FIG. 34 is a diagram illustrating an image of a dead zone width change in performing V1-V2 control.

FIG. 35 is a diagram illustrating a schematic configuration of a voltage control device which is an operation device portion in the individual control device.

FIG. 36 is a diagram illustrating a schematic configuration of a voltage control device which is an operation device portion in the individual control device.

FIG. 37 is a diagram illustrating an example of a processing of an operation region determination of individual control device operation prediction and an evaluation target distance calculation for a V2-Q1 control method of the individual control device (individual VQC).

FIG. 38 is a diagram illustrating an image of a dead zone width change in performing V2-Q1 control.

DESCRIPTION OF EMBODIMENTS

Hereinafter, embodiments according to the present invention will be described with reference to the drawings.

Since the embodiments according to the present invention include various forms, an overview of each embodiment will be described first prior to the detailed description.

Embodiments according to the present invention include a central device that performs assisting or monitoring of a setting value calculation of individual VQC of a power system, and further include individual control devices which are operated by data transmitted from an independent device and the central device installed at individual positions of the power system. By adopting these configurations assisted from the central device, the labor of an operator may be reduced. In the following description, a voltage control device such as LTC is an object controlled by an individual control device, and in a broad sense, it is described as a concept including a voltage control device such as LTC.

In Embodiment 1 described below with reference to FIGS. 1 to 12, a voltage/reactive power operation assisting device is described, which predicts the operation of the individual control device by using data to be evaluated, target value data, individual control device data, individual control device control method data such as simulation values obtained by adding measured values, predicted values, arbitrary fluctuations, and the like of the system and calculates and displays the difference between the device operation data used when calculating the target value data and the individual control device operation prediction result in the operation of the voltage control device of the power system (in the following description, this is described as a concept included in the individual control device, in some cases). It is possible to reduce the labor of an operator by providing a wealth of information for the operator to determine, by displaying the difference between the individual control device operation prediction results.

In Embodiment 2 to be described with reference to FIG. 13 to FIGS. 18A and 18B, in the voltage/reactive power operation assisting device of the system configuration according to Embodiment 1, the data to be evaluated and the device operation data thereof are provided by using past data utilization calculation, power flow calculation, the optimal power flow calculation. In the related art, these pieces of information are entered by the operator, but these pieces of information can be obtained automatically, saving the labor of an operator.

In Embodiment 3 to be described with reference to FIGS. 19 to 24, in the voltage/reactive power operation assisting device having the system configuration according to Embodiment 1 or Embodiment 2, the data to be evaluated and the device operation data are obtained by performing the past data utilization calculation, the power flow calculation and the optimal power flow calculation in which conditions are changed by using the difference calculation result.

In Embodiment 4 to be described with reference to FIGS. 25 to 29, in the voltage/reactive power operation assisting device having the system configuration of the system configuration according to Embodiment 1, Embodiment 2, or Embodiment 3, each calculation is performed by taking future changes into consideration using the prediction calculation to obtain each result.

In Embodiment 5 to be described with reference to FIGS. 30 to 34, the voltage/reactive power operation assisting device having the system configuration according to Embodiment 4 is provided in a form capable of indirect control of the so-called central VQC, by including a voltage/reactive power operation monitoring control device for adding a monitoring control function, which is set as a central device and has a function of transmitting the reference value, the target value, or the setting value to the individual control device.

In Embodiments 6 and 7, examples of various modifications of configuring the voltage/reactive power operation assisting device or the voltage/reactive power operation monitoring control device are introduced.

Embodiment 1

The voltage/reactive power operation assisting device according to Embodiment 1 will be described with reference to FIGS. 1 to 12.

FIG. 2 is a diagram illustrating an overall configuration example of the power system and a hardware configuration of the voltage/reactive power operation assisting and monitoring control device according to Embodiment 1 of the present invention. In the drawing, a configuration example of a power system 100 and a hardware configuration example of the voltage/reactive power operation assisting and monitoring control device 10 will be described, but first, a configuration example of the power system 100 will be described, and then, a hardware configuration example of the voltage/reactive power operation assisting and monitoring control device 10 will be described.

In each of the drawings of the present invention, the voltage/reactive power operation assisting and monitoring control device 10 may be regarded as a central device for the individual control device, but its function may be divided into the assisting function and the monitoring control function. For this reason, in each of the drawings to be described below, the "voltage/reactive power operation assisting and monitoring control device 10" as used herein is in reality the voltage/reactive power operation assisting device 10, or the voltage/reactive power operation monitoring control device 10 depending on the embodiments. In Embodiments 1 to 4, the former case will be described, and the latter case will be described in Embodiment 5.

The power system 100 designated by '100' and illustrated in FIG. 2 mainly represents a power transmission system part, but the scope corresponds to a plurality of regions divided in the power system in Embodiment 1 according to the present invention. The voltage/reactive power operation assisting and monitoring control device 10 corresponds to a central device which is installed at a local power supply command station for monitoring control in a plurality of regions divided in the power system and performs monitoring control of the power system. In a broad sense, the power system is a concept other than the range indicated as 100, which includes a power generation system and a load system. In the following description, it is used in a broad meaning unless particularly necessary.

The power system includes a power supply 110 (110a and 110b), a node (bus) 120 (120a, 120b, 120c, 120d, 120e, 120f, 120g, 120h, 120i, and 120j), a transformer 130 (130a, 130b, 130c, 130d, and 130e), a branch (line) 140 (140b, 140e, 140f, 140g, and 140h), a load 150 (150a, 150b, and 150c), and the like as major main circuit components, and a power capacitor (SC: Static Condenser) 160 (160a, 160b, 160c, and 160d) and a shunt reactor (ShR: Shunt Reactor) 170 (170a and 170b) are arranged as the power adjustment devices at appropriate places.

The transformers 130c and 130e are tapped transformers, and the power capacitor 160b and the shunt reactors 170a and 170b are connected to the tertiary winding, respectively. Although not illustrated in FIG. 2, one or a plurality of other controllable devices (batteries, rechargeable secondary batteries, EV storage batteries, flywheels, other phase adjustment facility (Static Var Compensator (SVC), Static Var Generator (SVG), phase regulator transformer Loop Power Controller (LPC), and the like) are provided.

In order to control a power system including a plurality of these various devices, various measurement devices 44 are arranged at appropriate places for respective purposes at various places of the power system. Individual control devices 45 (45a and 45b) for controlling the controllable devices among these plurality of various devices are arranged at appropriate places for respective purposes.

Among the various devices and the like described above, contents, structure, features, and the like of the devices deeply related to the present invention are described below.

First, the power supply 110 includes not only a rotating system power supply such as a thermal power generator, a hydroelectric power generator, a nuclear power generator, or the like, but also a distributed power supply such as a photovoltaic power generation system or a wind power generation system, and an inverter power supply connected to the power system through an inverter.

The measurement device 44 measures one or a plurality of a node voltage V, a branch current I, an active power P, a reactive power Q, a power factor $\phi$, a tap value of the power system, or on/off information of a switching facility such as a node, a branch, a transformer, a power capacitor, and a shunt reactor. This is an instrument transformer voltage transformer (VT), an instrument transformer potential transformer (PT), and an instrument current transformer (CT), for example, and includes telemeter (TM) and supervision (SV), and the like, which have a function of transmitting data including the data measurement part identification ID and the built-in time stamp of the measuring apparatus. It should be noted that it may be a device that measures power information with absolute time (phasor information of voltage) using GPS, a phase measurement units (PMU), or another measuring device. It is described that the measurement device 44 is in the power system. 100, but it may be installed on a bus or a line connected to the power supply 110, the transformer 130, the tapped transformer 131, the load 150, the power capacitor 160, the shunt reactor 170, the measurement device 44, and the individual control device 45.

The power system of FIG. 2 is generally as described above. On the other hand, the voltage/reactive power operation assisting and monitoring control device 10 according to Embodiment 1 of the present invention receives the reception data (system measurement data D1) 71 from the measurement device 44 of the power system 100 through the communication network 300. In this case, the data content of the reception data 71 may include other data, but in the voltage/reactive power operation assisting and monitoring control device 10, the system measurement data D1 is basically handled as data to be evaluated D1. The data to be evaluated D1 indicates data measured on a predetermined bus, for example.

Specifically, the data to be evaluated D1, which is the data content of the reception data 71, is data including one or a plurality of the node voltage V, the branch current I, the power factor $\phi$, the active power P, and the reactive power Q measured by the measurement device 44, and is received by the voltage/reactive power operation assisting and monitoring control device 10 through the communication network 300 and stored in an internal database to be evaluated DB1. Meanwhile, instead of directly receiving the data to be evaluated D1 from the measurement device 44, the data to be evaluated D1 may be aggregated into other monitoring devices and then stored in the database to be evaluated DB1 through the communication network 300, or may be stored in the database to be evaluated DB1 through the communication network 300 from the measurement device 44 or other monitoring device. The data to be evaluated D1 may include a unique number and a time stamp for identifying data. The other monitoring devices include a central power supply command station, a system stability monitoring server, and the like, for example.

The hardware configuration of the voltage/reactive power operation assisting and monitoring control device 10 in FIG. 2 is as follows. Since the voltage/reactive power operation assisting and monitoring control device 10 generally includes a computer device, it is provided with a display unit 11, an input unit 12 such as a keyboard and a mouse, a communication unit 13, a computer or a computer server (Central Processing Unit (CPU) 14), a memory 15, and various databases DB. These are mutually connected by a bus line 43.

Among these, the display unit 11 is configured as a display device, for example, but may be configured by using a printer apparatus, a sound output device, and the like instead of or in addition to the display device.

The input unit 12 may be configured to include at least one of a keyboard switch, a pointing device such as a mouse, a touch panel, a voice instruction device, and the like.

The communication unit 13 includes a circuit and a communication protocol for connecting to the communication network 300.

The CPU 14 reads a predetermined computer program from the program database 51 and executes the same. The CPU 14 may be configured as one or a plurality of semiconductor chips, or may be configured as a computer device such as a calculation server.

The memory 15 is configured as a Random Access Memory (RAM), stores a computer program read from the program database DB11, and stores calculation result data, image data, and the like necessary for each processing, for example. The screen data stored in the memory 15 is sent to the display unit 11 for display. An example of the screen to be displayed will be described below.

Specifically, the various database DBs are as follows. The database DB include the database to be evaluated DB1 that stores data to be evaluated D1, a target value database DB2 that stores target value data D2, an individual control device control method database DB3 that stores individual control device control method data D3, a device operation database DB4 that stores device operation data D4, an individual control device database DB5 that stores individual control device data D5, an individual control device operation prediction result database DB6 that stores individual control device operation prediction result data D6, a difference calculation result database DB12 that stores difference calculation result data D12, and a program database DB11 that stores program D11.

Among the data stored in these databases, the data to be evaluated D1 may be collected through other monitoring control devices or may be input from various measurement devices. Data related to system facility may also be received manually or from a central power supply command station or the like. Each data may be set in advance and stored in database. Data exchange performed through the bus line 43 includes command value, time and ID data.

While FIG. 2 illustrates the hardware configuration of the voltage/reactive power operation assisting and monitoring control device 10, FIG. 1 illustrates the voltage/reactive power operation assisting and monitoring control device 10 in terms of internal processing function thereof.

The processing function of FIG. 1 includes a series of processing units in the calculation unit 41, and is illustrated as a processing step in which data from the input system database DBI forms data of the result system database DBO by a series of processing in the calculation unit 41. In this case, the databases DB1 to DB6 and DB12 illustrated in FIG. 2 are positioned in one of the input system database DBI and the result system database DBO.

In the input system database DBI, the predicted value database DB1, the target value database DB2, the individual control device control method database DB3, the device operation database DB4, the individual control device database DB5 are positioned. In the result database DBO, the individual control device operation prediction result database DB6 and the difference calculation result database DB12 are positioned.

The calculation unit 41 includes an individual control device operation prediction unit 31 and a difference calculation unit 39. According to the series of processing of the calculation unit 41, the individual control device operation prediction unit 31 acquires the respective data D1 to D3, D5, predicts the operation of the individual control device, and accumulates the individual control device operation prediction result data D6 in the individual control device operation prediction result database DB6.

The difference calculation unit 39 calculates a difference between the predicted individual control device operation prediction result data D6 and the device operation data D4, and accumulates the difference in the difference calculation database DB12.

In the display unit 11 of FIG. 2, one or more pieces of various data accumulated in the database DB are displayed in an appropriate format automatically, or according to an instruction from the operator. For example, one or more of the data to be evaluated D1, the target value data D2, the individual control device control method data D3, the individual control device data D5, the device operation data D4, the individual control device operation prediction result data D6, the difference calculation result data D12 are displayed.

Referring to the series of processing of the calculation unit 41 described above, these are processing for enabling the operator to make a decision, by predicting how the individual control device would be operated when the target value of the individual control device of the power system is changed and calculating the difference between the prediction result, to display whether the target value that the operator attempts to change can be realized by the actual device and whether the effect as predicted by the operator can be obtained when the target value is changed. In the embodiments described below, while the difference is displayed on a display unit 20 as an example, it is also possible that the predicted value and the device operation data are displayed for comparison.

This processing is useful in a power system operation scenario to be described below. For example, on the individual control device side (substation, in many cases) of the power system, the voltage/reactive power control at the device installation point is planned for each season and for each day of the week, and setting values such as voltage/reactive power are systematically changed. On the other hand, it may be said that it is not necessarily optimal that the individual control devices are operated individually when viewed from the central device side that monitors the entire power system. Therefore, in the voltage/reactive power operation assisting device 10 according to Embodiment 1, when the target value of the individual control device of the power system is changed with the voltage/reactive power setting value in the individual control device as the device operation data, how the individual control device will be operated is predicted and the prediction result and the voltage/reactive power setting value (device operation data) are presented for comparison such that data for enabling evaluation of the validity of the processing may be presented for review at a stage before the planned change of the voltage/reactive power setting value of each individual control device side. Hereinafter, a method for realizing these series of processing will be described in detail.

FIG. 3 illustrates various programs stored in the program database DB11. In the program database DB 11, for example, an individual control device operation prediction program Pr31 for realizing the function of the individual control device operation prediction unit 31, a difference calculation program Pr39 for realizing the function of the difference calculation unit 39, and a screen display program Pr11 for realizing the function of the display unit 11 are stored as the program data D11.

Returning to FIG. 2, the CPU 14 executes the calculation program (the individual control device operation prediction program Pr31, the difference calculation program Pr39, the screen display program Pr11) readout from the program database DB11 to the memory 14 to perform individual control device operation prediction, difference calculation, display of various screens, instruction of image data to be displayed, retrieval of data in various databases, and the like.

The memory 14 is a memory for temporarily storing image data for display, each of the data D1 to D6, D12, each calculation temporary data, and each calculation result data, and necessary image data is generated by the CPU 14 and displayed on the display unit 11 (for example, a display screen). The display unit 11 of the voltage/reactive power operation assisting and monitoring control device 10 may be a simple screen only for rewriting each control program Pr or database DB.

A plurality of databases DBs are stored in the voltage/reactive power operation assisting and monitoring control device 10 of the power system. With respect to the other databases DBs (DB1 to DB5, DB6, and DB12) excluding the program database DB, the data contents handled here will be described in more detail.

The data to be evaluated D1 stored in the database to be evaluated DB1 is a primary side voltage value V1 and a secondary side voltage value V2 of a bus line installed in the individual control device 45 measured by the measurement device 44, for example. The V1 and V2 may not be measured values, and may instead be predicted values predicted by the operator or the prediction device, or may be simulated values obtained by adding the output variation of the renewed energy or the like to the measured value and the predicted value by the operator, for example. The measured value, the predicted value, and the simulated value may be data at one time point or data at a plurality of time points. In the case of the plurality of time points, for the evaluation results, the results calculated for each of the plurality of time points are displayed. The data to be evaluated D1 may be calculated or stored by another system such as the monitoring control device, the central power supply command station or the EMS, or may be manually input. For manual inputting, it is manually input by the input unit 12 and stored. For inputting, it is preferable that necessary image data is generated by the CPU 14 and displayed on the display unit 11. For inputting, it may be performed semi-manually so that a large amount of data may be set by using complement function.

FIG. 4 illustrates an example of the target value data D2 stored in the target value database DB2. In the target value database DB2, as target value data D2, a target value, a dead zone width, and the like required for the control method of each individual control device are stored. In the example of FIG. 4, with respect to the individual control device 45a, when the individual control device 45a is controlled by the V1-V2 control method, the target value (0.995 at time t1, 1.000 at time t2), the upper dead zone width, and the lower dead zone width (no change at all) of the voltage V1 are stored for each time, and the target value (1.005 at time t1, 1.010 at time t2), the upper dead zone width, and the lower dead zone width (no change at all) of the voltage V2 are stored for each time. It should be noted that the data to be set may be data of only one time point.

With respect to the upper dead zone width and the lower dead zone width illustrated in FIG. 4, "NO CHANGE" means that the preset upper side dead zone width and the preset lower side dead zone width stored in the individual control device control method data D3 are the same as the upper side dead zone width and the lower side dead zone width. In such a case, the preset value is copied. It should be noted that the target value data D2 may be set remotely from the monitoring control device, the central power supply command station or the EMS, or may be input manually. For manual inputting, it is manually input by the input unit 12 and stored. For inputting, necessary image data is generated by the CPU 14 and displayed on the display unit 11. For inputting, it may be performed semi-manually so that a large amount of data may be set by using complement function.

FIG. 5 illustrates an example of the individual control device control method data D3 stored in the individual control device control method database DB3. In the individual control device control method database DB3, as the individual control device control method data D3, the control method of each individual control device and the previously set preset target value, the preset upper side dead zone width, the preset lower side dead zone width, the operation conditions, and the like required for each control method, are stored as illustrated in FIG. 5.

In the example illustrated in the drawing, V1 has a reference voltage of 525 (KV), and V2 has a reference voltage of 285 (KV), and, for V1, the preset target value (p.u) is 0.990 at time t1, and 0.995 at time t2, the operating condition (p.u·second) is 0.50 at time t1 and time t2, the preset upper side dead zone width (p.u) is 0.003 at time t1 and time t2, and the preset lower side dead zone width (p.u) is 0.004 at time t1 and time t2. Since the same applies to V2, redundant explanation with numerical values will be skipped.

The operating condition herein refers to a determination value of the integration in which, when the preset target value and the voltage V1 or the voltage V2 of the dead zone width are separated, the voltage V1 and the voltage V2 are integrated respectively, and the device operation is performed when the integrated value exceeds the operating condition. The individual control device control method data D3 may be set remotely from the monitoring control device, the central power supply command station or the EMS, or may be input manually. For manual inputting, it is manually input by the input unit and stored. For inputting, necessary image data is generated by the CPU 14 and displayed on the display unit 11. For inputting, it may be performed semi-manually so that a large amount of data may be set by using complement function.

FIGS. 6A and 6B illustrate an example of the individual control device data D5 stored in the individual control device database DB5. The individual control device database DB5 stores, as the individual control device data D5 for the phase adjustment devices SC and ShR which are the individual control devices 45*a* and 45*b* as illustrated in FIG. 6A, numbers representing up to how many pieces of SCs and ShRs of each capacity may be arranged in parallel to the system (in 45*a*, 8 pieces of SCs with 40 MVA and 8 pieces of SCs with 20 MVA, and in 45*b*, 16 pieces of SCs with 40 MVA and 16 pieces of SCs with 20 MVA, and 2 pieces of ShRs with −20 MVA), how long a delay would be in operation, and with respect to LRT, step value per 1 tap operation (p.u/tap), upper and lower limit values (p.u) and operation delay (s) in each individual control device 45*a* and 45*b*.

As illustrated in FIG. 6B, the operation state at each time is stored. In this example, with respect to the individual control device 45*a*, at time t1, there are 4 pieces of SCs with 40 MVA, 2 pieces of SCs with 20 MVA, and the LRT operated with 6 taps, and at time t2, there are 4 pieces of SCs with 40 MVA, 4 pieces of SCs with 20 MVA, and the LRT operated with 7 taps. These data may be stored by using the input unit 12 of the voltage/reactive power operation assisting and monitoring control device 10, or may be stored from other monitoring devices.

FIG. 7 illustrates an example of the device operation data D4 stored in the device operation database DB4. The individual control device database DB4 stores, as the device operation data D4, the operation positions of the phase adjustment facility and the LRT as illustrated in FIG. 7. In this example, with respect to the individual control device 45*a*, at time t1, there are 4 pieces of SCs with 40 MVA, 2 pieces of SCs of 20 MVA, and the LRT operated with 6 taps, and at time t2, there are 4 pieces of SCs with 40 MVA, 4 pieces of SCs with 20 MVA, and the LRT operated with 7 taps. These data may be stored by using the input unit 12 of the voltage/reactive power operation assisting and monitoring control device 10, or may be stored from other monitoring devices.

The individual control device operation prediction result database DB6 stores, as the individual control device operation prediction result data D6, data having the same format as the device operation data D4 that is predicted by the individual control device operation prediction unit 31 and stored in the device operation database DB4. This prediction method will be described below with reference to FIG. 9.

The difference calculation result database DB12 stores, as difference calculation result data D12, a difference result between, on the one hand, the individual control device operation prediction result data D6 that predicts how the individual control device would be operated when the target value of the individual control device of the power system is changed, and on the other hand, the device operation data D4 used for changing the target value of the individual control device, which is, ultimately, the difference between the device operation data D4 stored in the device operation database DB4 and the individual control device operation prediction result data D6. This difference screen will be described below with reference to FIG. 12.

Next, the calculation processing of the voltage/reactive power operation assisting and monitoring control device 10 will be described with reference to FIG. 8. FIG. 8 illustrates an example of a flowchart illustrating the entire processing of the voltage/reactive power operation assisting and monitoring control device. The flow will be briefly explained, and then each part will be described in detail.

First, individual control device operation prediction is performed by using the data to be evaluated D1, the target value data D2, the individual control device control method data D3, and the individual control device data D5. The result of individual control device operation prediction is stored in the individual control device operation prediction result database 26. Next, a difference calculation is performed by using the calculated individual control device operation prediction result data D6 and the device operation data D4. The result of the difference calculation is stored in the difference calculation result database 52. Finally, one or more of the data to be evaluated D1, the target value data D2, the individual control device control method data D3, the individual control device data D5 and the device operation data D4, the individual control device operation prediction result data D6, and the difference calculation result data D12 are displayed on the screen. The various calculation results and data accumulated in the memory during the calculation may be sequentially displayed on the screen of other monitoring devices. Thereby, the operator may easily determine the operation state of the voltage/reactive power operation assisting and monitoring control device 10. The flow of the above processing will be described step by step.

In the flowchart of FIG. 8, the processing described above is executed as follows. First, in processing step S20, the data to be evaluated D1, the target value data D2, the individual control device control method data D3, and the individual control device data D5 are acquired and read into the memory.

In processing step S31 executed by the individual control device operation prediction program Pr31 of FIG. 3, individual control device operation prediction is performed by using the data to be evaluated D1, the target value data D2, the individual control device control method data D3 and the individual control device data D5 read into the memory at the processing step S20. Here, an example of the individual control device operation prediction processing will be described in detail using the processing flow of FIG. 9.

In processing step S311, first, the individual control device to be predicted is selected. The targeted individual control device is selected according to the order stored in the individual control device data D4 of FIG. 7 and the order arbitrarily designated by the operator.

In processing step S312, the operation region determination of the data to be evaluated is performed. Prior to describing the determination of the operation region of the data to be evaluated, a configuration of the voltage control device such as the LTC and a concept of the V1-V2 control method will be described.

FIG. 35 illustrates a schematic configuration of a voltage control device such as an LTC, which is an operation device portion in the individual control device, for example. A tap is formed in the primary winding of the LTC, and a capacitor SC and a reactor ShR are installed in the tertiary winding. The operation in the LTC is performed by switching on/off (hereinafter referred to as "SC (ShR) input/cut") of the circuit breakers CBC and CBS (including electronic operation) and raising and lowering taps. The V1 and V2 are the primary winding side voltage and the secondary winding side voltage in LTC, and the directions of the arrows will be explained as positive.

FIG. 10 illustrates an example in which the individual control device performs control with the V1-V2 control method. FIG. 10 illustrates a so-called V1-V2 plane in which V1 is taken on the horizontal axis and V2 is taken on the vertical axis. The V1-V2 plane is divided into a first quadrant R1 with V1 positive-V2 positive, a second quadrant R2 with V1 negative-V2 positive, a third quadrant R3 with V1 negative-V2 negative, and a quadrant R4 with V1 positive-V2 Negative, and with respect to V1 in the vicinity of point 0 (zero), upper limit value is V1L1, and lower limit value is V1L2, and with respect to V2 in the vicinity of point 0 (zero), upper limit value is V2L1, and lower limit value is V2L2, thereby forming the dead zone regions L1, L2, L3, and L4. While the region L in which the dead zone regions L1, L2, L3, L4 are all established is set close to point 0 (zero) in FIG. 10, this may be set to another appropriate position to meet need as appropriate, but in any case, it causes the operating point of the voltage control device to move into the dead zone region L. The positions after the movement into the dead zone region L are the setting voltages V1ref and V2ref. Here, an example where point 0 (zero) is the setting voltages V1ref and V2ref is illustrated.

FIG. 10 illustrates the relationship between the changing directions of the voltages V1 and V2 with inputting and cutting of the SC and ShR in the LTC and raising and lowering of the taps. The operation of SC and ShR acts in the region R1' where $V1 \geq V1L1$ and $V2 \geq V2L2$ and the region R3' where $V1 \leq V1L2$ and $V2 \leq V1L1$ in FIG. 10, in which the SC cutting and ShR inputting acts in a direction to raise the voltage V1, and the SC inputting and ShR cutting acts in a direction to lower the voltage V1. The operation of the tap acts in the region R2' where $V2 \geq V2L1$ and $V1 \leq V1L1$ and the region R4' where $V2 \leq V2L2$ and $V1 \leq V1L2$ in FIG. 10, in which the tap raising acts in a direction to raise the voltage V2, and the tap lowering acts in a direction to lower the voltage V2.

With the assumption that the V1-V2 plane is defined as above, in processing step S312, the operation region determination of the data to be evaluated is performed as follows.

For this determination, the coordinates of the setting voltage V1ref and V2ref and the coordinates (V1t1, V2t1) of the voltages V1 and V2 at the evaluation target point Y at the current time are used. In the illustrated example, the coordinates of the setting voltage are (V1ref and V2ref)=(0, 0) and the coordinates of the voltage at the present time are (V1t1, V2t1)=(V1L2-ΔV1, V2L2-ΔV2). Accordingly, it is indicated that the current coordinates (V1t1, V2t1) of the voltages V1 and V2 are in the third quadrant, and when the voltage V1 is increased by ΔV1 by inputting SC or cutting ShR and the voltage V2 is increased by ΔV2 by raising tap, it may be controlled within the dead zone region L.

In the region determination using these data, it is determined as a region R1' when V1t1>V1ref, V2t1>V2ref, and V1t1-V1ref>V1L1. It is determined as R1' when V1t1>V1ref, V2t1>V2ref, and V2t1-V2ref>V2L1.

Likewise, when V1t1<V1ref, V2t1<V2ref, and V2ref-V1t1>V1L2, it is determined as R3'. When V1t1<V1ref, V2t1<V2ref, and V1ref-V1t1>V2L2, it is determined as R3'.

By analogy to the above, it is also possible to determine the regions R2' and R4', and accordingly, detailed explanation for each will be skipped.

According to this determination, it may be determined that it is controllable by changing the dead zone.

In the example of FIG. 10, since the evaluation target point Y is in the third quadrant, it may be determined that it is an operation region of SC inputting/ShR cutting. That is, a difference between the setting voltages V1ref and V2ref and (V1t1, V2t1) of the evaluation target point Y at the current time on the V1-V2 plane is obtained, and further, a difference between the upper dead zones or the lower dead zones is obtained, and depending on whether it is positive or negative, it is determined which region the evaluation target point Y is located. When it is within the dead zone region, it is determined that the individual control device is not operated. By using the individual control device data D5 acquired in processing step S20, it is determined whether the voltage control device in that region may be operated any further. For example, since it is not possible to input SC when operated up to the upper limit value of SC inputting in the SC inputting region, it is determined that there will be no further operation.

As illustrated in FIG. 11, when the preset target voltages V10 and V20 are changed to the target voltages V1 and V2 in the first quadrant, since the region of the evaluation target point Y changes, such operation is confirmed. By also displaying such a view, there is an effect that the operator may be urged to notice.

In processing step S313, the evaluation target distance calculation is performed by using the calculation result of processing step S312. First, in processing step S312, when the evaluation target point is in the dead zone region, the processing moves to processing step S315. In the other regions, the distances outside the dead zone region are obtained with respect to the V1 and V2 axes as ΔV1 and ΔV2. In the third quadrant illustrated in FIG. 10, ΔV1 and ΔV2 are obtained as illustrated in FIG. 10. Next, the smaller one of Δ1 and ΔV2 is determined as the evaluation target distance.

In processing step S314, an operation time prediction calculation is performed by using the evaluation target distance obtained in processing step S313 and each data acquired in processing step S20. The result of the operation time prediction calculation is obtained by dividing the value of the operation condition of the individual control device control method data D3 by the evaluation target distance obtained in processing step S313. At this time, if ΔV1<ΔV2, then 0.5 [p.u·second]/ΔV1 [p.u]=T [seconds]. This "T seconds" is the operation time prediction calculation result of the voltage control device in the individual control device.

In processing step S315, it is determined whether or not all the individual control devices is selected. When all are selected, the processing proceeds to processing step S39 of FIG. 8, and otherwise, the processing proceeds to processing step S311 and the operation is repeated until a series of processing is executed for all the individual control devices.

The result of individual control device operation prediction described above is stored in the individual control device operation prediction result database DB6.

Returning to FIG. 8, in processing step S39 executed by the difference calculation program Pr39 in FIG. 3, the difference calculation is performed by using the calculated individual control device operation prediction result data D6 and the device operation data D4. For example, when the difference is calculated in FIGS. 6B and 7, it is found that there are two differences generated with respect to 20 MVA of the phase adjustment facility SC in the section of t2. The result of this difference calculation is stored in the difference calculation result database DB12 of FIG. 1.

Finally, in processing step S11, one or more of the data to be evaluated D1, the target value data D2, the individual control device control method data D3, the individual control device data D5 and the device operation data D4, the individual control device operation prediction result data D6, and the difference calculation result data D12 are displayed on the screen. The various calculation results and data accumulated in the memory during the calculation may be sequentially displayed on the screen of other monitoring devices. Thereby, the operator may easily determine the operation state of the voltage/reactive power operation assisting and monitoring control device 10.

Here, an example of the display of the output screen will be described with reference to FIG. 12. In the example of the display of the output screen of FIG. 12, the screen has three screens including screens 90, 91, and 92, in which the screen 90 displays the input of the data to be evaluated together with the acquisition time. In the screen 91, the individual control devices 45a and 45b are tab selectable, and the voltages V1 and V2 on the V1-V2 plane are displayed together with the evaluation target point and the time on the first quadrant, for example. On the screen 92, difference calculation results are listed and displayed according to time in the form of table.

According to this display example, by displaying the screen 91 which enables to recognize the individual control device operation prediction result as illustrated in FIGS. 11 and 10 and the screen 92 which enables to recognize the difference calculation result, there is an effect that the operator is able to confirm the results easily. By displaying each data acquired in processing step S20 of FIG. 8 on the screen 90 as illustrated in FIGS. 4 to 7, there is an effect that the operator may easily determine the data to be evaluated D1 and the individual control device data D5. It is to be noted that each individual control device to be monitored may be switched by a tab, but it is also possible to arrange the views in parallel by treating them as windows. As a result, there is an effect of ease of comparison for the operators.

There is an effect that, by referring to the result data of the individual control device operation prediction and the various data in processing step S31, the operator can make a prediction as to whether or not the individual control device is operated when the data to be evaluated D1 is used, and how long it will be operated when it is operated, and such may be noticed when examining data to be evaluated.

By referring to the difference calculation result data and various data in processing step S39, it is possible to determine whether or not the individual control device is operated as expected when the data to be evaluated is used, and accordingly, such may be noticed when examining the data to be evaluated.

Accordingly, even when there occurs one or more of following: the variations in the voltage and the power flow become larger due to output variation of renewable energy and the like; or the power supply configuration and the system configuration are changed, it is possible to achieve the effect of reducing the labor of an operator to set the reference value, the target value, or the setting value of the voltage control device.

While Embodiment 1 has been described based on the assumption that the relationship between the data to be evaluated D1 and the device operation data D4 is necessarily required, only the data to be evaluated D1 may be set by the operator, in which it may still be possible to output the operation prediction result to evaluate the effect of the prediction operation without the device operation data D4, as will be described below with reference to Embodiment 3.

Embodiment 2

In Embodiment 2 described below with reference to FIGS. 13 to 18A and 18B, a function of providing the data to be evaluated D1 and its device operation data D4 by using the past data utilization calculation, the optimal power flow calculation, the optimal power flow calculation, is added to the system configuration of Embodiment 1.

In Embodiment 1, the above data is provided to the voltage/reactive power operation assisting and monitoring control device 10 by the determination and input of the operator in advance, and are stored in the database to be evaluated DB1 and the device operation database DB4, but in Embodiment 2, these data are automatically generated by the evaluation target calculation unit 30 by estimation from the measurement data DX1 and the system facility data DX2, and are stored in the database to be evaluated DB1 and the device operation database DB4. The description of the same operation portion in the constitutional parts same as those of Embodiment 1 will not be described.

FIG. 13 illustrates an example of the overall configuration diagram of the voltage/reactive power operation assisting and monitoring control device 10 according to Embodiment 2, with the configuration different from that of Embodiment 1 in that a system measurement data base DBX1 for storing the system measurement data DX1 and a system facility database DBX2 for storing the system facility data DX2 are added to the input system database DBI of FIG. 1 of Embodiment 1, and the evaluation target calculation unit 30 is added to the calculation unit 41.

FIG. 14 illustrates an example of a hardware configuration of the voltage/reactive power operation assisting and monitoring control device 10 and an overall configuration diagram of the power system 100 according to Embodiment 2, with a configuration different from that of Embodiment 1 in that a system measurement database DBX1 and a system facility database DBX2 are added to the database DB of FIG. 2.

Here, the system measurement data DX1 and the system facility data DX2 are supplementarily described.

The system measurement data database DBX1 stores, as the system measurement data DX1, the active power P, the reactive power Q, the voltage V, the voltage phase angle $\delta$, the current I, the power factor $\phi$, the tap value, information on/off switching of switching facility between the power system and the nodes, branches, transformers, SC, ShR, and the like.

These may be time stamp data or PMU data. For example, the voltage and voltage phase angle at node 120 connected to the power system 100 of FIG. 14, the line current I or the line power flow (P+jQ) of the branch 140 connected to the node 120 connected to the power system 100, a line current I or a line power flow (P+jQ) of the transformer 130 connected to the node 120 connected to the power system 100, a voltage V and a voltage phase angle δ of the node 121 connected to the transformer 130, a voltage V, a current I, an active power P, a reactive power Q, or a power factor φ of the power supply 110 connected to the node 120, a voltage V, a current I, an active power P, a reactive power Q and a power factor φ of the load 150, any one or a plurality of the voltage V and the current I, the active power P, the reactive power Q, the power factor φ, the voltage V and voltage phase angle δ, the tap values of transformer 130, the switching information on on/off switching of switching facility between nodes, branches, transformers, SC, ShR, and the like of other nodes, branches, power supplies, loads, control devices, and the like connected to the power system 100 which is measured through the communication network by the measurement device 44, other monitoring devices, and the like are stored. The voltage phase angle δ may be measured by using the phase measurement device PMU or other measurement devices using GPS. The measurement device is information from a meter transformer VT, a meter transformer PT, a meter current transformer CT, a telemeter TM or a supervision SV having a function of transmitting data, and the like. The line power flow (P+jQ) may be calculated from the current I, the voltage V, and the power factor φ measured by VT, PT, CT, and the like. The system measurement data may be obtained from the monitoring control device, the central power supply command station, and the EMS, or may be obtained directly from the measurement device of the entire system. As another example of the system measurement data DX1, it may be the past data.

The system measurement data DX1 may be converted into plausible data after state estimation processing is performed. The state estimation calculation is a calculation function of estimating the plausible state of a system in a specific time section by determining the presence or absence of abnormal data in the observation data electric power transmission and distribution facility such as substation, power plant, transmission line and removing abnormal data, based on observation data and connection data. Here, the state estimation calculation can be performed according to various methods such as "Lars Holten, Anders Gjelsvlk, Sverre Adam, F, F, Wu, and Wen-Hs lung E, Liu, Comparison of Different Methods for State Estimation, IEEE Transaction on Power Systems, Vol, 3 (1988), pp, 1798-1806", and the like, for example.

In the system facility database DBX2, the system configuration, the line impedance (R+jX), the ground capacitance (admittance: Y), the power supply data, and the like are included and stored as the system facility data DX2. The system configuration includes connection relationships of one or a plurality of bus, the line, the power supply, the load, the transformer, and respective control devices of the system. The system facility data DX2 may be obtained from the monitoring control device, the central power supply command station, the EMS, or may be input manually. For manual inputting, it is manually input and stored by the input unit 12. For inputting, necessary image data is generated by the CPU 14 and displayed on the display unit 11. For inputting, it may be performed semi-manually so that a large amount of data may be set by using complement function.

FIG. 15 illustrates an example of a configuration diagram illustrating the contents of the program database DB11 of the voltage/reactive power operation assisting and monitoring control device according to Embodiment 2, which is different from Embodiment 1 in that an evaluation target calculation program Pr30 is added.

FIG. 17 illustrates an example of a flowchart illustrating the entire processing of the voltage/reactive power operation assisting and monitoring control device according to Embodiment 2, which is different in that a processing step S30a and a processing step S30b are added. The processing steps after step S20 are the same as those in Embodiment 1. Here, the added processing step S30a and processing step S30b will be described.

First, in processing step S30a, the system measurement data DX1 and the system facility data DX2 are acquired and read into the memory. Next, in processing step S30b, an evaluation target calculation of which the contents of the detailed processing is illustrated in FIG. 18A or 18B is performed by using the system measurement data DX1 and the system facility data DX2, and then the result is stored in the database to be evaluated DB1 and the device operation database DB4.

Here, the processing of the evaluation target calculation in processing step S30b will be specifically described with reference to FIGS. 18A and 18B. FIG. 18A illustrates an example in which optimal power flow calculation (OPF) and power flow calculation (PF) are used, and FIG. 18B illustrates an example in which the past data illustrated in FIG. 16 is used. FIG. 16 will be described below.

First, the case of using the power flow calculation processing of FIG. 18A will be described.

In the first processing step S30b11 in FIG. 18A, arbitrary calculation conditions of the operator are set. First, the calculation conditions in using the optimal power flow calculation (OPF) will be described. The conditions vary depending on the objective function and the constraint conditions of the optimal power flow calculation (OPF) in processing step S30b12, but basically, the inequality constraints such as the upper and lower limit voltage of the bus to be evaluated, the upper and lower limits of the generator reactive power output, and the upper and lower limits of the interconnect line reactive power output, the equality constraints of the power flow equation of the target system, the objective function, and when the objective function are formed by a plurality of terms, the respective weight values, operating variables such as generator reactive power output, on/off switching of SC and ShR of the phase adjustment facility, and transformer tap position, and an upper limit number of convergence calculation, the convergence determination value, and the setting value necessary for various optimization calculation are set.

In processing step S30b12, the optimal power flow calculation (OPF) is executed based on the calculation conditions set in processing step S30b11. Here, an example of the calculation equation of the optimal power flow calculation (OPF) is illustrated in Equation 1.

[Equation 1]

$$\begin{aligned}\min\ & f(x, p) \\ \text{subject to}\ & g_i(x) \le 0\ (i = 0, \ldots, m) \\ & h_j(x) \le 0\ (j = 0, \ldots, n)\end{aligned} \quad (1)$$

Here, f(x) is an evaluation function, such as an active power transmission loss, a reactive power transmission loss, a total fuel cost due to a change in the active power output distribution of the power supply, or a reactive power output of the power supply due to a change in the power factor of each power supply, which is related to economic efficiency and is an evaluation function for any one or a plurality of these items. However, in the case of a plurality of items, weighting, which is performed in advance may be performed.

In Equation (1), h(x) is an equality constraint condition and is regarded as an active and reactive power flow equation, for example. Here, g(x) is an inequality constraint condition (penalty function), for example, and is an inequality constraint condition for one or a plurality of target value constraints (voltage upper and lower limit constraints), power generator reactive power output upper and lower limit constraints, power flow upper and lower limit constraints, and the like. However, the inequality constraint condition may be treated as a constraint value instead of a penalty, but when the convergence is degraded, it is preferable to achieve an improvement in convergence by embedding an objective function as a penalty function. When the convergence is degraded, a solution may be obtained by additionally performing a processing for alleviating the value of the penalty function. As a result, there is an effect that a solution may be reliably obtained.

Here, as an example of the evaluation function f(x), a specific expression in adopting the active power transmission loss $P_{Loss}(x)$ of the entire system is expressed by Equation (2), a specific expression in adopting the reactive power transmission loss $Q_{Loss}(x)$ of the entire system is expressed by Equation (3), a specific expression in adopting the total fuel cost p due to a change in the active power output distribution of the power supply is expressed by Equation (4), a specific expression in adopting the total sum $Q_{Gall}(x)$ of the reactive power output of the power supply due to a change in the power factor of each power supply is expressed by Equation (5), and a specific expression in adopting the total sum of the deviation between the voltage target value and the voltage measurement value of the bus to be monitored is expressed by Equation (6). In the following examples, each evaluation function is described separately, although one or more combinations may be used.

[Equation 2]

$$P_{Loss}(x) = \sum_{i=1}^{N} \sum_{j=1}^{N} |P_{ij} + P_{ji}| = \sum_{i=1}^{N} \sum_{j=1}^{N} [G_{ij}\{V_i^2 + V_j^2 - 2V_iV_j\cos(\theta_i - \theta_j)\}] \quad (i \neq j) \quad (2)$$

In Equation (2) for obtaining the active power transmission loss $P_{Loss}(x)$ of the entire system, i, j∈Ωv is the bus to be monitored, N is a total number of bus numbers (i=1 to N), $P_{ij}$ is an active power from the bus i to j, $P_{ji}$ is an active power from the bus j to i, $G_{ij}+jB_{ij}$ is a real part and imaginary part of a bus admittance matrix, $V_i$ and $V_j$ are the magnitudes of voltages of the bus i and the bus j, $\theta_i$ and $\theta_j$ are the phase angles of the bus i and the bus j, respectively. However, a relation of $G_{ij}+jB_{ij}=1/(R_{ij}+jX_{ij})$ is established, and $R_{ij}+jX_{ij}$ is an impedance of a line.

[Equation 3]

$$Q_{Loss}(x) = \sum_{i=1}^{N} \sum_{j=1}^{N} |Q_{ij} + Q_{ji}| = \sum_{i=1}^{N} \sum_{j=1}^{N} [-B_{ij}\{V_i^2 + V_j^2 - 2V_iV_j\cos(\theta_i - \theta_j)\} - y_{ij}(V_i^2 + V_j^2)] \quad (i \neq j) \quad (3)$$

In Equation (3) for obtaining the reactive power transmission loss $Q_{Loss}$ (x) of the entire system, $Q_{ij}$ is a reactive power from the bus i to bus j, $Q_{ji}$ is a reactive power from the bus j to the bus i, and yij is an admittance a ground capacitance component of the bus.

[Equation 4]

$$\text{Cost}(p) = \sum_{g=1}^{m}(\alpha_g p_g^2 + \beta_g p_g + \gamma) \quad (4)$$

In Equation (4) for obtaining the total fuel cost Cost (p) due to a change in the active power output distribution of the power supply, $\alpha_g$, $\beta_g$, $\gamma_g$ are coefficients of a fuel consumption characteristic of a power generator g, $P_g$ is an active output of the power generator g, and m is the number of power generators.

[Equation 5]

$$Q_{Gall}(x) = \sum_{m}|Q_g| \quad (5)$$

In Equation (5) for obtaining the sum $Q_{Gall}(x)$ of the reactive power outputs of the power supply due to a change in the power factor of each power supply, $Q_G$ is a reactive power output of the power generator g, and m is the number of power generators. Meanwhile, the power factor may be calculated according to the magnitude of $Q_G$ and may be converted into a cost by using the coefficient of the fuel consumption characteristic of the power generator g.

[Equation 6]

$$V(x) = \sum_{i=1}^{M}(v_i - v_{iref})^2 \quad (6)$$

Here, V(x) is the total sum of the deviations between a voltage target value and a voltage measurement value of a bus to be monitored, I, j∈Ωv is a bus to be monitored, M is a total number of buses to be monitored (i=1 to M), $v_i$ is a voltage measurement value of the bus i, and $v_{jref}$ is a target value of the bus i.

By solving the constrained minimization problem, it is possible to obtain a terminal voltage of the power generator, on/off value of the phase adjustment facility, a tap value of the transformer, and the like. An example of the control variable x at this time is illustrated in Equation (7). The control variable x is defined by a vector expression of Equation (7) based on SC, ShR, a tap value (Tap) of the transformer with tap which is a portion to be controlled, a command value of AVR/AQR of a power generator, a phase regulator, line switching. In this embodiment, a solution may be obtained by using the on/off value of the phase adjustment facility and the tap value of the transformer as operation variables.

[Equation 7]

$$x = [SC, ShR, Tap]^T = [SC_1 \ldots SC_n, ShR_1 \ldots ShR_m, Tap_1 \ldots Tap_p]^T \quad (7)$$

In Equation (7), SC, is the amount of bank insertion of the n-th SC, ShRm is the amount of insertion of the m-th ShR, Tapp is a tap position of the p-th LRT, Vgq is a terminal voltage of the q-th power generator, n is the number of facilities of SC, M is the number of facilities of ShR, p is the number of facilities of LRT, and p is the number of facilities of Vg.

Regarding the optimization calculation, an interior point method, an active constraint method, a simplex method, or the like may be applied as a linear plan problem due to a linearized system, a primal-dual interior point method, a maximum entropy method, or the like may be applied as a secondary plan problem, a steepest descent method, a quasi-Newton method, a penalty function method, or the like may be applied as a non-linear plan problem, and an augmented Lagrangian multiplier method or the like may be applied as a non-linear plan problem with constraint. The optimization calculation may be a method performed by applying genetic algorithm which is meta-heuristic, simulated annealing, tab search, or particle swarm optimization (PSO) to each problem, a combination optimization problem, a mixed integer non-linear optimization problem, or the like. As an example of the calculation equation of the optimum power flow calculation (OPF), for example, it is described in "Sekine et al., Optimal power flow calculation (OPF) of the power system, March 2002, NEC Corporation, pp. 133-207". As an optimum power flow calculation (OPF) with stability constraint, the methods described in "Sekine et al., Optimal Power Flow Calculation (OPF) of the Power System, March 2002, NEC Corporation, pp. 58-66" may be used. The power flow calculation may be performed according to a method such as "WILLIAM F TINNEY, CLIFFORD E HART, Power Flow Solution by Newton's Method, IEEE Transaction on Power APPARATUS AND SYSTEMS, VOL. PAS-86, NO. 11 (1967) pp. 1449-1967", for example.

According to the solving method of optimal power flow calculation (OPF), solving as a discrete value or solving as a continuous value are conceivable. For solving as a discrete value, inputting and cutting values of the phase adjustment facility and tap value of the transformer are the solutions as they are, but when solving as a continuous value, the solution may be discretized by replacing it with a discrete value closest to those values.

As described above, in processing step S30b12, Equations (1) to (7) are appropriately executed in the optimal power flow calculation (OPF).

Based on the above calculations, the data to be evaluated D1 may be obtained from the device operation data D4 for obtaining the optimal power flow state and the power flow state when the device operation is performed.

Returning to FIG. 18A, in processing step S30b13, the result of the processing step S30b12 is displayed so that the operator may determine whether the result is OK or not. Here, the result displayed includes the device operation data D4 for obtaining the optimal power flow state, and the data to be evaluated D1 and the calculation condition thereof in the power flow state when the device operation is performed.

In processing step S30b14, from the displayed result of processing step S30b13, the operator determines whether or not the result is OK. For the determination, a threshold value may be set in advance and when the threshold value is exceeded, it may be semi-automatically determined to be OK.

In processing step S30b15, the device operation data D4 and the data to be evaluated D1 determined as OK in processing step S30b14 and calculated in processing step S30b13 are stored in the respective databases.

The setting based on the power flow calculation in FIG. 18A is a method of achieving optimization, as an operator determines calculation condition setting and determines whether or not the result is OK heuristically or by the method of steepest descent along the iteration of the setting, by the operator, the calculation condition in processing step S30b11, calculating of the power flow in processing step S30b12, confirming the evaluation value such as the transmission/distribution loss in processing step S30b13, and then determining whether or not the result of the processing step S30b14 is OK. The result may be obtained by such a method. As a result, it is possible to obtain the result based on the power flow calculation without complicated calculation, so that there is an effect that the past knowledge of the operator may be utilized. Although not illustrated in the drawing, in processing step S30b12 of the optimal power flow calculation/power flow calculation, in order to obtain data to be evaluated and device operation data for the operator to achieve certain stability, transient stability calculation, voltage stability calculation and steady state stability calculation may be combined.

Here, as specific transient stability calculation method, it may be carried out according to the method described in "Prabha Kundur, Power System Stability and Control, The Epri Power System Engineering (1994) pp. 827-954", "Development of Stability Integrated Analysis System of Large-Scale Power System, Central Research Institute of Electric Power Industry T14 (1990)", and "Analysis and Operation Technology Supporting Use of Power System, Technical report of Electric Institute 1100 (2007) pp. 106-110, Institute of Electrical Engineers of Japan". As calculation of voltage stability, calculation of PV curves may be carried out according to the methods described in "Development of Voltage Stability Analysis Method of Power System, Central Research Institute of Electric Power Industry T37 (1995)", "Prabha Kundur, Power System Stability and Control, The Epri Power SystemEngineering (1994) pp. 977-1012", "Chiang. H. D. et al., CPFLOW: A Practical Tool for Tracing Power System Steady-State Stationary Behavior Due to Load and Generation Variations, IEEE Trans. on Power Systems, Vol. 10, No. 2, pp. 623-634, 1995", "Venkataramana Ajjarapu, Computational Techniques for Voltage Stability Assessment and Control, Springer, 2006, pp. 49-116", JP-A-H6-153397, and the like. The calculation of the V-Q curve can be performed according to a calculation method or the like described in "Stable Operation Technology Technical Committee of Power System, Stable Operation Technology Electric Collaboration Research of Power System, Volume 47, No. 1, pp. 24-26". The steady-state stability calculation may be a steady-state stability calculation method which is the same calculation as the transient stability calculation, and may be a method based on various calculations such as eigenvalue calculation described in "Analysis and Operation Technology Supporting Use Of Power System, Technical report of Electric Institute 1100

(2007) pp. 105-106" and "Prabha Kundur, Power System Stability and Control, The Epri Power System Engineering (1994) pp. 699-822".

Next, an example of using the processing of FIG. 18B will be described. In FIG. 18A, the optimal power flow calculation (OPF) and the power flow calculation (PF) are used, whereas FIG. 18B illustrates an example of using the past data illustrated in FIG. 16.

In the example of the past data illustrated in FIG. 16, past data on device operation, change of target value, and change of indicator are preserved in time series. For the device operation, for example, when the individual control device 45a is a phase adjustment facility such as SC or ShR, the number of units and the tap position are stored in time series for each capacity-specific device, the target voltages V1 and V2 are stored in time series for the individual control devices 45a and 45b, and the like, as the change of target value, and the transmission/distribution losses are stored in time series as the change of indicator.

For the processing in processing step S30b in FIG. 18B, reference is made to the past data in FIG. 16. In processing step S30b21, the operator may retrieve and display the past data. The past data is data in which the device operation and the change of the target value and the change of the indicator are stored as illustrated in FIG. 16. The past data is stored for each past time and may be displayed by retrieving necessary past data. For example, by narrowing down and retrieving for data of which indicator change is decreased, the operator may easily retrieve desired past data. Although not illustrated in the drawing, data close to the current power flow section may be displayed. Compared with the method of using the optimal power flow calculation and the power flow calculation described above, since the operation was verified in the past, there is an effect that it is possible to select an operation close to the idea of the operator.

In processing step S30b22, the past data extracted by retrieving and displaying in processing step S30b21 is selected, and the device operation data D4 and the data to be evaluated D1 retrieved in processing step S30b21 are stored in each database.

According to Embodiment 2, unlike the related art in which these pieces of information are input by the operator, the information can be obtained automatically, thus saving the labor of an operator.

Embodiment 3

In Embodiment 3, a configuration example of the voltage/reactive power operation assisting and monitoring control device 10, which is added with a condition change calculation unit 32 for changing the condition based on the difference calculation result data according to Embodiment 2, and recalculating the data to be evaluated D1 and the device operation data D4, will be described. The description of the same operation portion in the constitutional parts same as those of Embodiment 2 will not be described. In Embodiment 3, while a structure as a derivative system of Embodiment 2 is described, it may be a configuration that the condition change calculation unit 32 is added to Embodiment 1.

In Embodiment 3 to be described with reference to FIGS. 19 to 24, in the system configuration according to Embodiment 1 or Embodiment 2, the data to be evaluated D1 and the device operation data D4 are obtained by performing the past data utilization calculation, the power flow calculation and the optimal power flow calculation in which conditions are changed by using the difference calculation result.

FIG. 19 illustrates an example of the overall configuration diagram of the voltage/reactive power operation assisting and monitoring control device 10 according to Embodiment 3, which is different from Embodiment 2 in that the condition change calculation unit 32 is added to the calculation unit 41 of FIG. 1 of Embodiment 2, and a condition change calculation result database DBX3 is added to the result system database DBO.

FIG. 20 illustrates an example of a hardware configuration of the voltage/reactive power operation assisting and monitoring control device 10 and an overall configuration diagram of the power system 100 according to Embodiment 3, which is different from Embodiment 2 in that the condition change calculation result database DBX3 is added as the database of FIG. 14.

FIG. 21 illustrates an example of a configuration diagram illustrating the contents of the program database of the voltage/reactive power operation assisting and monitoring control device according to Embodiment 3, which is different in that a condition change calculation program Pr32 is added.

FIG. 22 illustrates an example of a flowchart illustrating the entire processing of the voltage/reactive power operation assisting and monitoring control device according to Embodiment 3, which is different in that processing step S32 is added. The other processing steps are the same as in Embodiment 2. Processing steps added here will be described.

In processing step S32, the processing of one or both of FIGS. 23A and 23B is performed by using the difference calculation result data D12 and each data of the input system database DBI.

The processing illustrated in FIG. 23A is a processing for ascertaining to what extent the effect is obtained by the predicted operation even when a difference occurs between the individual control device operation prediction result data D6 and the device operation data D4. As a result, even when a difference occurs, the operator may easily confirm how much effect may be exhibited by the specified device operation. The operator may confirm this effect and calculate new data to be evaluated and device operation data newly as needed by using the evaluation target calculation unit or manually, and may further confirm the effect. As a result, there is an effect of improving the efficiency of the trial and error operation and reducing the labor of an operator to set the reference value, the target value, or the setting value of the voltage control device.

In processing step S321 in FIG. 23A, the power flow calculation is performed using the individual control device operation prediction result data D6 under the condition where this prediction operation occurs. At this time, by calculating also the transmission and distribution loss, which is the indicator illustrated in FIG. 16, there is the effect that the effect of the prediction operation may be easily confirmed.

In processing step S322 of FIG. 23A, the condition calculated in processing step S321 and the calculated indicator are stored in the condition change calculation result database DBX3.

As a result, even when a difference occurs, there is an effect that the occurrence of difference is prevented, since the operator can easily confirm which kind of device operation need to be performed, and which target values need to be set so that the device is operated as expected. The operator confirms using this calculation result and the function of FIG. 23A and calculate new data to be evaluated and device operation data newly as needed by using the evaluation target calculation unit or manually, and may further confirm the effect. As a result, there is an effect of improving the efficiency of the trial and error operation and reducing the labor of an operator to set the reference value, the target value, or the setting value of the voltage control device.

On the other hand, the processing illustrated in FIG. 23B is a processing for narrowing down the operation variables of the optimal power flow calculation (OPF) based on the difference between the individual control device operation prediction result data D6 and the device operation data D4, and obtaining the device operation that the individual control device operation prediction result data D6 is operable.

The processing step S323 is a processing of changing the operation variable of the optimal power flow calculation (OPF) by using the individual control device operation prediction result data. For example, a situation is assumed as illustrated in FIG. 24 which is a diagram provided to explain an example of processing of changing the operation variable of the optimal power flow calculation (OPF).

FIG. 24 illustrates a situation in which, with respect to the vertical and horizontal target voltages V1 and V2, while it is necessary that one tap of the transformer is increased and one SC is input, in the device operation for setting the target voltage, since the evaluation target point is in the operation region R3 of the third quadrant, only the SC input operation may be performed. In this situation, in processing step S323, the operation variable is changed such that the tap action is excluded from the operation variable. When the operator determines that the operation of the device that moves without relying on the individual control device control method data (for example, the operation of the PSVR, which is an automatically operated device, and the like) is affected, it is also possible to perform this processing by removing the individual control device control method data from the operation variables.

In processing step S324, the optimal power flow calculation is performed again using the result of narrowing down the operation variables in processing step S323. Here, an example of the optimal power flow calculation is illustrated, but as described above, the power flow calculation and the calculation of the narrowed-down device operation data may be performed. As a result, operable device operation data and target value data which is the operation result thereof may be obtained as a calculation result.

In processing step S325, the result of the optimal power flow calculation (OPF) in processing step S324 is displayed as an intermediate or final result. At this time, by calculating also the transmission and distribution loss, which is the indicator illustrated in FIG. 16, there is an effect that the effect of the prediction operation may be easily confirmed.

In processing step S326, the condition and result calculated from processing step S323 to the processing step S325 are stored in the condition change calculation result database DBX3.

According to Embodiment 3, the data to be evaluated and the device operation data may be obtained by performing the condition change calculation according to the difference, and it is possible for the operator to deal with the next stage.

Embodiment 4

In Embodiment 4, by adding the prediction calculation unit 33 to Embodiment 3, it is possible to provide a voltage/reactive power operation assisting and monitoring control device and each method in a power system, capable of the calculation of Embodiment 3 even when the power flow state or the like of the power system changes by considering future changes, and as time passes, also capable of one or more of maintaining the balance between and a setting range of the voltage and the reactive power of the power system, improving economic efficiency, and reducing the labor of an operator for setting a reference value, a target value, or a setting value of a voltage control device. The description of the same operation portion in the constitutional parts same as those of Embodiment 3 will not be described. In Embodiment 4, while the structure as a derivative system of Embodiment 3 is described, it may be a configuration that the condition change calculation unit is added to Embodiment 1.

Embodiment 4 to be described with reference to FIGS. 25 to 29 requires that, in the system configuration according to Embodiment 1 or Embodiment 2 or Embodiment 3, each calculation be performed by taking into consideration future changes using the prediction calculation to obtain each result.

FIG. 25 illustrates an example of the overall configuration diagram of the voltage/reactive power operation assisting and monitoring control device 10 according to Embodiment 4, in which the prediction calculation unit 33 is added to the calculation unit 41 of FIG. 19 of Embodiment 3, and of which the configuration is different in that the plan value database DBX4 and the prediction calculation result database DBX5 are added as the database.

FIG. 26 illustrates an example of a hardware configuration of the voltage/reactive power operation assisting and monitoring control device 10 and an overall configuration diagram of the power system 100 according to Embodiment 4, which is different from. Embodiment 3 in that the plan value database DBX4 and the prediction calculation result database DBX5 are added as the database of FIG. 20.

FIG. 27 illustrates an example of a configuration diagram illustrating the contents of the program database of the voltage/reactive power operation assisting and monitoring control device according to Embodiment 4, which is different in that the prediction calculation program Pr33 is added.

FIG. 28 is a diagram illustrating stored contents of the plan value database DBX4. The plan value data DX4 will be described with reference to FIG. 28. The plan value data DX4 in the plan value database DBX4 includes a demand prediction result, a power generator output plan, and a control plan, and stored for each future time. In the demand prediction result and the power generator output plan, the active power P and the reactive power Q at each time are stored, and in the control plan, it is stored for each time with the time of inputting or cutting various devices or the magnitude of a specific control amount. The prediction calculation unit 33 may calculate the prediction calculation result data DX5 used in the evaluation target calculation unit 30 by performing the power flow calculation for each future prediction time section by using these future values.

FIG. 29 illustrates an example of a flowchart illustrating the entire processing of the voltage/reactive power operation assisting and monitoring control device according to Embodiment 4, which is different in that the processing step S33 is added and the plan data DX4 is added in the data acquisition of the first processing step S30a. The other processing steps are the same as in Embodiment 3. Processing steps added here will be described.

In processing step S33, the prediction calculation according to Equations (8) and (9) described below is performed by using the plan value data DX4, and the prediction calculation result data DX5 is stored. The subsequent processing steps are the same as in Embodiment 3. The prediction calculation result data DX5 is data in which voltage, active power, reactive power, and the like of each node are stored as time series data. While it is described herein that the prediction calculation result data DX5, which is the future data described above, may be calculated and stored by another system such as the monitoring control device, the central power supply command station or the EMS, or may be input manually, the data may be calculated by the calculation method of this embodiment.

A calculation of the substation individual active power load and substation individual reactive power load necessary for prediction calculation, may be performed according to various methods including, for example, the method described in "Ishida et al., Feasibility Study on Feed-Forwarding Voltage Reactive-Power Control Method Based on LP Method, The transactions of the Institute of Electrical Engineers of Japan B, Vol. 117, No. 8, pp. 1116-1120, 1997".

Specifically, the active power output of each power generator is estimated and calculated from the total demand prediction result data and the generator fuel consumption characteristic data by using economic load distribution (ELD). The load having the substation individual active power is predictively calculated from the total demand prediction result data and substation load to total demand ratio data by using the following Equation (8).

[Equation 8]

$$P_{li} = P_{all} \times \text{ratio}_i \qquad (8)$$

Here, $P_{li}$ is the active power load prediction result of the substation i, $P_{all}$ is the total demand prediction result, and $\text{ratio}_i$ is the ratio of active power load to total demand of substation i.

The substation individual reactive power load is predicted and calculated from the prediction result of the substation individual active power load and the substation load PQ correlation data by using the following Equation (9).

[Equation 9]

$$Q_{li} = f_i(P_{li}) \qquad (9)$$

Here, $Q_{li}$ is a reactive power load prediction result of the substation i, and $f_i$ is a PQ correlation of the substation i.

The power flow state in the future time section may be predicted and calculated from the generator active power output power prediction result, the substation individual active power load prediction result and the substation individual reactive power load prediction result by using the AC power flow calculation method.

According to Embodiment 4, each calculation may be performed by taking into consideration future changes, and each result may be obtained by using each prediction calculation.

Embodiment 5

In Embodiment 5, from the system configuration of Embodiment 4, a configuration capable of so-called central VQC indirect control is provided, in which the central apparatus is provided with a function of transmitting the reference value, the target value or the setting value to the individual control device. For the description of Embodiment 5, an example will be described, in which the LP method is used for the optimization calculation. As a method of central VQC, an example using a two-step operation device calculation method will be described. A specific method of the two-step operation device calculation method may be performed according to various methods including, for example, the method described in "Ishida et al., Feasibility Study on Feed-Forwarding Voltage Reactive-Power Control Method Based on LP Method, The transactions of the Institute of Electrical Engineers of Japan B, Vol. 117, No. 8, pp. 1116-1120, 1997".

Embodiment 5 will be described with reference to FIGS. 30 to 34.

FIG. 30 illustrates an example of the overall configuration diagram of the voltage/reactive power operation assisting and monitoring control device 10 according to Embodiment 5, which is different from Embodiment 4 in that a dead zone width calculation unit 35 is added to the calculation unit 41 in FIG. 25, that a command unit 36 is added, and that an individual control device target value database DBX6 is added to the result system database DBO.

FIG. 31 illustrates an example of a hardware configuration of the voltage/reactive power operation assisting and monitoring control device 10 and an overall configuration diagram of the power system 100 according to Embodiment 5, which is different in that an individual control device target value database DBX6 is added as the database of Embodiment 5, and an individual control device target value data DX6 is transmitted to the individual control devices 45a and 45b as transmission data.

FIG. 32 illustrates an example of a configuration diagram illustrating the contents of the program database of the voltage/reactive power operation assisting and monitoring control device according to Embodiment 5, which is different in that a dead zone width program Pr35 is added.

FIG. 33 illustrates an example of a flowchart illustrating the entire processing of the voltage/reactive power operation assisting and monitoring control device in Embodiment 5, which is different in that a processing step S35 is added, that a processing step S36 is added, and that a central VQC, and in terms of the flow for calculating the individual control device target value data DX6 with the indirect control of the central VQC. The other processing steps are largely the same as those in Embodiment 4.

In processing step S35, dead zone width change calculation as illustrated in FIG. 34 is performed. In the illustration of the dead zone width change with the evaluation target point Y positioned in the third quadrant illustrated in FIG. 34, by changing the target value and the dead zone by lowering the target voltage V1, for example, the dead zone region may be expanded to the region including the evaluation target point Y. Conversely, by increasing the target voltage V1, the dead zone region can be reduced to the region not including the evaluation target point, in which a tap operation is also available, for example. The image of the dead zone width change with the tap raising and lowering operations is illustrated by the arrows M1 and M2.

For the dead zone width calculation, reference can be found in, for example, "Suzuki et al.: Measures to Enhance Performance of a Voltage/Reactive Power Control Device of a Substation for Trunk System, Annual Meeting Record, I.E.E. Japan, 1104 (1989)", with which the dead zone width is calculated so that the desired operation may be performed using the dead zone width change.

In processing step S36, the individual control device target value data DX6 obtained in processing step S50 and the processing step S35 is transmitted to the individual control device. Here, the individual control device target value data DX6 corresponds to the output of the individual device operation prediction unit 31 or the dead zone width calculation unit 35 in FIG. 30. When obtaining the output of the individual device operation prediction unit 31 or the dead zone width calculation unit 35, it is required that the processing contents in the prediction calculation unit 39 and the condition change calculation unit 32 are reflected.

As an individual control device installed in the power system, there are devices with discrete values as operation variables, such as PSVR that may be treated as continuous values and devices having inputting/cutting operation of phase adjustment facility such as taps and SC/ShR. In the former case, there is no particular difficulty in using the two-step operation device calculation method as the central VQC method, but in the latter case, it is preferable to use the two-step operation device calculation method in a form devised as follows.

In an example of using this two-step operation device calculation method, it is preferable that only the discrete value operation variable is solved first (first optimization calculation), and then the operation of the discrete value is fixed and the continuous value as the operation variable is solved (second optimization calculation). Thus, it is possible to cope with a situation where a good solution may not be obtained, by mixing the continuous value and the discrete value. Regarding this method, reference is made to "Hayashi et al.: Improvement of VQC Control Using LP method", Electricity Power Engineering Workshop on Electrical Engineers, PE-93-166 (1993), for example.

In the LP method, the optimum values of the operating devices are collectively obtained, and for example, the number of the taps and the number of the SCs are returned as solutions of the linear program.

According to Embodiment 5, direct control from the central device on the individual control device is enabled.

Embodiment 6

In Embodiment 6, further improvement examples from each of the embodiments described above will be described in detail.

First of all, in each embodiment, not only display, but also communication for updating setting value may be sent.

It may also be possible for the operator to be able to communicate directly with the device operation to actually set the target value.

With respect to the target value, when it is confirmed that the individual VQC is not operated as expected, or that it is operated as expected but with the insufficient effect, the function described in Embodiment 3 for obtaining the desired effect by recalculating may be appropriately applied to other embodiments.

Meanwhile, it is preferable to adopt the following countermeasure as a method to cope with the case where the individual VQC is not operated as expected in response to the target value. For example, when indirectly controlling the individual VQC with the target value, it is possible to cope with the inability to operate at once, by sending a command automatically or manually to an operator in two stages (changing V1ref and then changing V2ref). It is also possible to provide a calculation unit for obtaining the multistage voltage setting value Vref. It is preferable to allow direct device operation for parts that individual VQC may not be operated with setting value change.

As a fail-safe for the time when the voltage setting value Vref is not generated, it is preferable to have a fixed Vref describing the countermeasure when Vref is not generated.

As a solution to the difference in VQC finished by remote transmission, it is preferable for the operator to provide a device operation command simultaneously with settling.

It is preferable to provide a calculation unit for obtaining the setting value and the amount of the direct device operation.

Embodiment 7

In Embodiment 7, instead of the V1-V2 control method, the concept of an example of performing the V2-Q1 control will be described.

Since the V1-V2 control method is described with reference to FIGS. 35 and 10, the details are not described, but in FIG. 36 corresponding to FIG. 35, V2 and reactive power Q are subject to control.

In FIG. 37 corresponding to FIG. 10, there is no significant difference in the idea of plane setting, the method of control, and the like except that the horizontal axis is changed from V1 to the reactive power Q, and the upper limit value V1L1 and the lower limit value V1L2 of the voltage V1 are set to the upper limit value QL1 and the lower limit value QL2 of the reactive power Q, and the V1-V2 control method including the region determination can be processed identically as described above.

FIG. 34 illustrates the illustration of the dead zone width change with the V1-V2 control method, but according to the image of the dead zone width change in performing the V2-Q1 control, it may be expressed as moving as indicated by the arrow M3 as illustrated in FIG. 38.

REFERENCE SIGNS LIST

10: voltage/reactive power operation assisting device-monitoring control device
11: display unit
12: input unit
13: communication unit
14: CPU
15: memory
DB1: database to be evaluated
DB2: target value database
DB3: individual control device control method database
DB4: device operation database
DB5: individual control device database
DB6: individual control device operation prediction result database
DB11: program database
DB12: difference calculation result database
DBI: Input system database
DBO: result database
31: individual control device operation prediction unit
39: difference calculation unit
41: calculation unit
43: bus line
44: measurement device
45$a$ and 45$b$: individual control device
71: reception data (system measurement data D1)
100: power system
110$a$, 110$b$: power supply
120$a$, 120$b$, 120$c$, 120$d$, 120$e$, 120$f$, 120$g$, 120$h$, 120$i$, 120$j$: node
130$a$, 130$b$, 130$c$, 130$d$, 130$e$: transformer
140$a$, 140$b$, 140$c$, 140$d$, 140$e$: branch
150$a$, 150$b$, 150$c$: load
160$a$, 160$b$, 160$c$, 160$d$: power capacitor
170$a$, 170$b$: shunt reactor,
300: communication network

The invention claimed is:

1. A voltage/reactive power operation assisting device comprising:
a first database for storing data to be evaluated, target value data, individual control device control method data, and individual control device data of an individual control device for adjusting a voltage/reactive power of a power system;
a second database for storing device operation data of the individual control device;
an individual control device operation prediction unit for predicting an operation of the individual control device from the data stored in the first database to obtain individual control device operation prediction data; and
a display unit for displaying the individual control device operation prediction data and the device operation data for comparison.

2. A voltage/reactive power operation assisting device comprising:
a first database for storing data to be evaluated, target value data, individual control device control method data, and individual control device data of an individual control device for adjusting a voltage/reactive power of a power system;
a second database for storing device operation data of the individual control device;
an individual control device operation prediction unit for predicting an operation of the individual control device from the data stored in the first database to obtain individual control device operation prediction data;
a difference calculation unit for obtaining a difference between the individual control device operation prediction data and the device operation data; and
a display unit for displaying the difference.

3. The voltage/reactive power operation assisting device according to claim 2, further comprising:
an evaluation target calculation unit that obtains the data to be evaluated by a power flow calculation using system measurement data and system facility data.

4. The voltage/reactive power operation assisting device according to claim 3, further comprising:
a condition change calculation unit for calculating data to be evaluated again in the evaluation target calculation unit by changing a condition using the difference data.

5. The voltage/reactive power operation assisting device according to claim 3, further comprising:
a prediction calculation unit for obtaining prediction calculation result data that stores voltage, active power, reactive power, and the like of each node of the power system as time series data, wherein a power flow calculation using system measurement data and system facility data in the evaluation target calculation unit is executed.

6. The voltage/reactive power operation assisting device according to claim 1, wherein
the individual control device operation prediction unit includes one or more of:
an operation region determination unit for determining an operation region of an individual control device when using data to be evaluated;
an evaluation target distance calculation unit for calculating an evaluation target distance; and
an operation time prediction calculation unit for predicting operation time.

7. A voltage/reactive power operation monitoring control device for providing individual control device target value data to an individual control device which is installed in a power system to adjust a voltage/reactive power of the power system, the voltage/reactive power operation monitoring control device comprising:
a first database for storing data to be evaluated, target value data, individual control device control method data, and individual control device data of an individual control device that adjusts a voltage/reactive power of a power system;
a second database for storing device operation data of the individual control device;
an individual control device operation prediction unit for predicting an operation of the individual control device from the data stored in the first database to obtain individual control device operation prediction data; and
a transmit unit that transmits a function for transmitting the individual control device operation prediction data to the individual control device as individual control device target value data.

8. The voltage/reactive power operation monitoring control device according to claim 7, further comprising:
an evaluation target calculation unit for obtaining the data to be evaluated by a power flow calculation using system measurement data and system facility data.

9. The voltage/reactive power operation monitoring control device according to claim 8, further comprising:
a condition change calculation unit for calculating the data to be evaluated again in the evaluation target calculation unit by changing a condition using difference data between the individual control device data and the device operation data.

10. The voltage/reactive power operation monitoring control device according to claim 8, further comprising:
a prediction calculation unit for obtaining prediction calculation result data that stores voltage, active power, reactive power, and the like of each node of the power system as time series data, wherein a power flow calculation using the system measurement data and the system facility data in the evaluation target calculation unit is executed.

11. The voltage/reactive power operation monitoring control device according to claim 7, wherein
the individual control device for adjusting the voltage/reactive power of the power system is configured to include a transformer tap and a phase adjustment facility, and to control an operating point within a predetermined dead zone width, and
the voltage/reactive power operation monitoring control device includes a dead zone width calculation unit for calculating the dead zone width determined by the transformer tap and the phase adjustment facility and sends the dead zone width determined by the dead zone width calculation unit to the individual control device as the individual control device target value data.

12. A voltage/reactive power operation assisting method comprising:
storing data to be evaluated, target value data, individual control device control method data, individual control device data, and device operation data of an individual control device for adjusting a voltage/reactive power of a power system;
obtaining individual control device operation prediction data by predicting an operation of the individual control device from the data to be evaluated, the target value data, the individual control device control method data, and the individual control device data;

and displaying the individual control device operation prediction data and the device operation data for comparison.

13. A voltage/reactive power operation assisting method comprising:
    storing data to be evaluated, target value data, individual control device control method data, individual control device data, and device operation data of an individual control device for adjusting a voltage/reactive power of a power system;
    obtaining individual control device operation prediction data by predicting an operation of the individual control device from the data to be evaluated, the target value data, the individual control device control method data, and the individual control device data;
    obtaining a difference between the individual control device operation prediction data and the device operation data; and
    displaying the difference.

14. A voltage/reactive power operation monitoring control method for providing individual control device target value data to an individual control device which is installed in a power system to adjust a voltage/reactive power of the power system, the method comprising:
    storing data to be evaluated, target value data, individual control device control method data, individual control device data, and device operation data of an individual control device for adjusting a voltage/reactive power of a power system;
    obtaining individual control device operation prediction data by predicting an operation of the individual control device from the data to be evaluated, the target value data, the individual control device control method data, and the individual control device data; and
    transmitting the individual control device operation prediction data to the individual control device as individual control device target value data.

* * * * *